United States Patent
Yu et al.

(10) Patent No.: US 8,879,657 B2
(45) Date of Patent: Nov. 4, 2014

(54) COMMUNICATION SYSTEM WITH WHITENING FEEDBACK MECHANISM AND METHOD OF OPERATION THEREOF

(71) Applicant: Samsung Electronics Co., Ltd., Gyeonggi-Do (KR)

(72) Inventors: Yingqun Yu, San Diego, CA (US); Jungwon Lee, San Diego, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 0 days.

(21) Appl. No.: 13/895,743

(22) Filed: May 16, 2013

(65) Prior Publication Data

US 2014/0072067 A1    Mar. 13, 2014

Related U.S. Application Data

(60) Provisional application No. 61/698,394, filed on Sep. 7, 2012.

(51) Int. Cl.
| | |
|---|---|
| *H04B 7/02* | (2006.01) |
| *H04B 7/04* | (2006.01) |
| *H04B 7/06* | (2006.01) |

(52) U.S. Cl.
CPC .................... *H04B 7/0417* (2013.01); *H04B 7/068* (2013.01)
USPC .......................................................... 375/267

(58) Field of Classification Search
USPC .................... 375/262, 265, 316, 340–341
See application file for complete search history.

(56) References Cited

U.S. PATENT DOCUMENTS

| | | | |
|---|---|---|---|
| 7,372,911 B1 * | 5/2008 | Lindskog et al. | 375/267 |
| 8,155,233 B1 | 4/2012 | Lee et al. | |
| 2007/0211813 A1 | 9/2007 | Talwar et al. | |
| 2009/0202005 A1 | 8/2009 | Cairns | |
| 2011/0268230 A1 | 11/2011 | Xu et al. | |

FOREIGN PATENT DOCUMENTS

WO    01-71426 A1    6/2011

OTHER PUBLICATIONS

U.S. Appl. No. 13/523,824, filed Jun. 14, 2012 in the name of Au Yeung et al.
U.S. Appl. No. 13/460,630, filed Apr. 30, 2012 in the name of Kwon et al.
U.S. Appl. No. 13/560,330, filed Jul. 27, 2012 in the name of Lee et al.

(Continued)

*Primary Examiner* — Khanh C Tran
(74) *Attorney, Agent, or Firm* — IP Investment Law Group

(57) ABSTRACT

A communication system includes: a covariance module configured to calculate a joint-covariance based on a receiver signal for communicating a communication content in a transmitter signal with an interference signal using subcarriers based on a space-frequency block-coding scheme; a preparation module, coupled to the covariance module, configured to generate a joint-whitener with a control unit based on the joint-covariance for randomizing the interference signal; a joint whitening module, coupled to the preparation module, configured to generate a joint-whitening output based on the receiver signal and the joint-whitener; a message processing module, coupled to the joint whitening module, configured to determine a joint-estimation feedback based on the joint-whitening output; and a cancellation module, coupled to the message processing module, configured to cancel the joint-estimation feedback from the receiver signal for communicating the communication content with a device.

20 Claims, 8 Drawing Sheets

(56) References Cited

OTHER PUBLICATIONS

Jungwon Lee et al., "Interference Mitigation via Joint Detection," IEEE J. Sel. Areas Commun., vol. 29, No. 6, Jun. 2011 See pp. 1172-1184.

Jungwon Lee et al., "Interference Mitigation in MIMO Interference Channel via Successive Single-user Soft Decoding,", In: Information Theory and Applications Workshop (ITA), San Diego, America, Feb. 5-10, 2012 See pp. 180-185.

* cited by examiner

COMMUNICATION SYSTEM WITH WHITENING FEEDBACK MECHANISM AND METHOD OF OPERATION THEREOF

CROSS-REFERENCE TO RELATED APPLICATION(S)

This application claims the benefit of U.S. Provisional Patent Application Ser. No. 61/698,394 filed Sep. 7, 2012, and the subject matter thereof is incorporated herein by reference thereto.

This application contains subject matter related to a concurrently filed U.S. Patent Application by Yingqun Yu and Jungwon Lee titled "COMMUNICATION SYSTEM WITH WHITENING MECHANISM AND METHOD OF OPERATION THEREOF". The related application is assigned to Samsung Electronics Co., Ltd., and is identified by Ser. No. 13/895,678. The subject matter thereof is incorporated herein by reference thereto.

TECHNICAL FIELD

An embodiment of the present invention relates generally to a communication system, and more particularly to a system with whitening feedback mechanism.

BACKGROUND

Modern consumer and industrial electronics, especially devices such as cellular phones, navigations systems, portable digital assistants, and combination devices, are providing increasing levels of functionality to support modern life including mobile communication. Research and development in the existing technologies can take a myriad of different directions.

The increasing demand for information in modern life requires users to access information at any time, at increasing data rates. However, telecommunication signals used in mobile communication experience various types of interferences from numerous sources, as well as computational complexities rising from numerous possible formats for communicated information, which affect the quality and speed of the accessible data.

Thus, a need still remains for a communication system with whitening feedback mechanism. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a communication system, including: a covariance module configured to calculate a joint-covariance based on a receiver signal for communicating a communication content in a transmitter signal with an interference signal using subcarriers based on a space-frequency block-coding scheme; a preparation module, coupled to the covariance module, configured to generate a joint-whitener with a control unit based on the joint-covariance for randomizing the interference signal; a joint whitening module, coupled to the preparation module, configured to generate a joint-whitening output based on the receiver signal and the joint-whitener; a message processing module, coupled to the joint whitening module, configured to determine a joint-estimate feedback based on the joint-whitening output; and a cancellation module, coupled to the message processing module, configured to cancel the joint-estimate feedback from the receiver signal for communicating the communication content with a device.

An embodiment of the present invention provides a method of operation of a communication system including: calculating a joint-covariance based on a receiver signal for communicating a communication content in a transmitter signal with an interference signal using subcarriers based on a space-frequency block-coding scheme; generating a joint-whitener with a control unit based on the joint-covariance for randomizing the interference signal; generating a joint-whitening output based on the receiver signal and the joint-whitener; determining a joint-estimate feedback based on the joint-whitening output; and cancelling the joint-estimate feedback from the receiver signal for communicating the communication content with a device.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
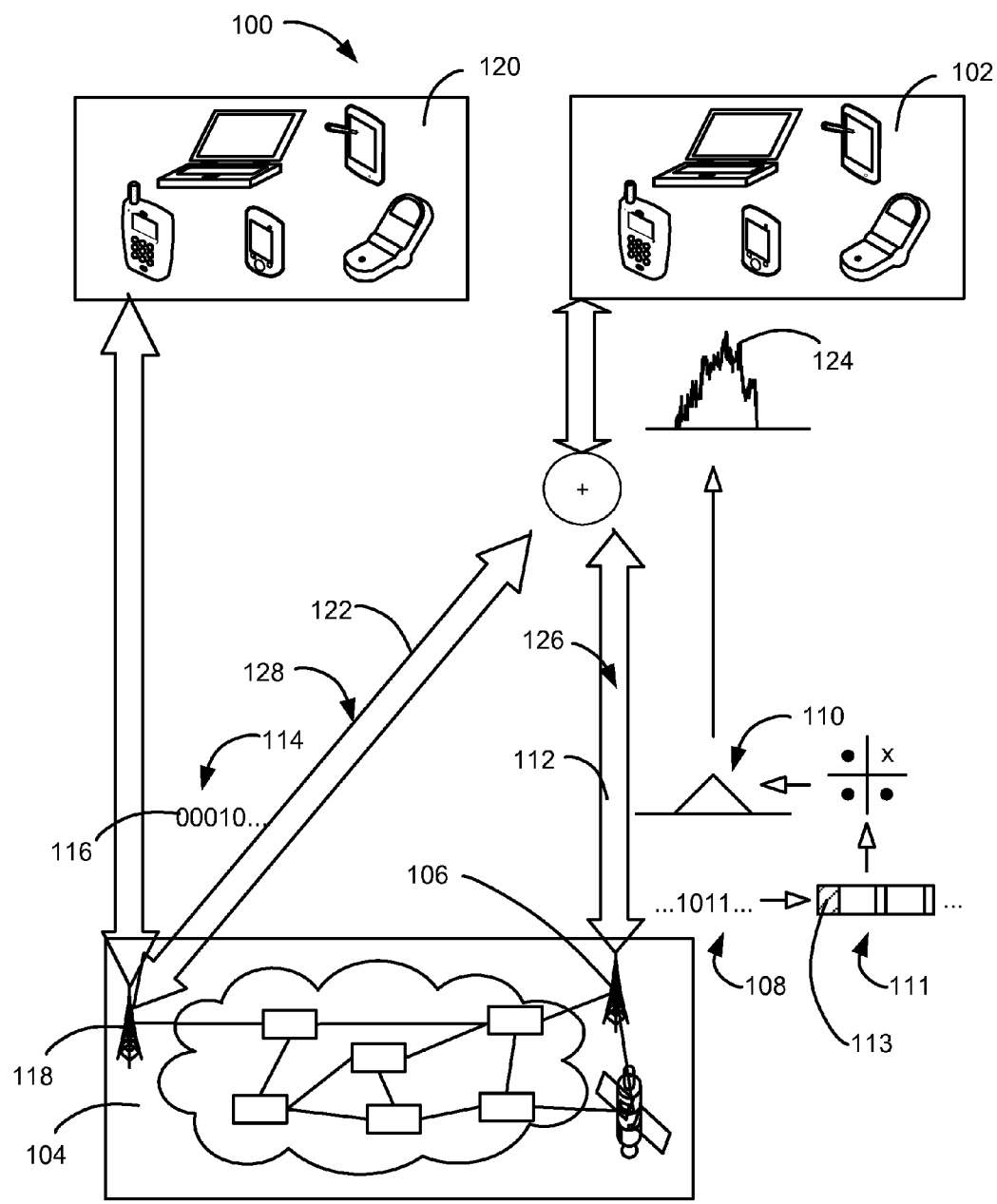
FIG. 1 is a communication system with whitening feedback mechanism in an embodiment of the present invention.

The following embodiments of the present invention can be used to process receiver signal corresponding to transmissions using space-frequency block-coding scheme. An initial whitening output based on initially whitening an interference signal with a base covariance and a base whitener can be further processed based on an iterative detection-decoding scheme.

Detecting and decoding with the iterative detection-decoding scheme can determine a joint-whitening output, which can be used to determine a joint-estimation feedback according to a feedback profile. The feedback information can be used to further jointly whiten the receiver signal using a joint-covariance and a joint-whitener for data transmitted using subcarriers according to the space-frequency block-coding scheme. A joint-whitening output from the joint whitening process can further be fed back using the joint-estimation feedback to determine communication content as originally intended for communication in the receiver signal.

The feedback profile, the iterative detection-decoding scheme, or a combination thereof can be configured to process one code word or two instances of the code word simultaneously. Further, a base processing branch and a further processing branch can be used with the feedback profile and the iterative detection-decoding scheme to successively cancel the interference signal from the receiver signal.

The joint-whitening output based on the base covariance and the base whitener provides reduction in error and increase throughput. The initial-whitening output from initially whitening the receiver signal using the base covariance and the base whitener, and the joint-whitening output from subsequently whitening for the space-frequency block-coding scheme using the joint-covariance and the joint-whitener provide increased robustness with faster processing time. The interference estimate and the joint-estimation feedback provide reliability and accuracy in detecting and decoding the communication content.

The iterative detection-decoding scheme in conjunction with the joint-covariance, the joint-whitener, and the joint-estimation feedback provide an effective way to iteratively suppress the interference signal based on the space-frequency block-coding scheme. The feedback profile passing the base feedback to the base cancelling module and the further detection module and passing the further feedback to the further cancellation module and the base detection module provides reliability and accuracy in detecting and decoding the communication content.

An adapted instance of a reference portion in the receiver signal can indicate that a transmitter signal, an interference signal, or a combination thereof was originally transmitted according to the space-frequency block-coding scheme.

A signal profile can characterize a transmission status of the transmitter signal, the interference signal, or a combination thereof. Joint-covariance and joint-whitener can be calculated and generated to comprehensively or jointly whiten and further process the receiver signal based on the signal profile. A joint-whitening output can be jointly detected and decoded to determine a communication content as originally intended for communication.

The signal profile and the reference portion adapted or adjusted to include information regarding the space-frequency block-coding scheme and provide increased accuracy and higher throughput. Also, the joint-covariance and the joint-whitener provide decreased error rate. Further, the joint-whitening output and the joint detection process provide increased transmission speed.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

The term "module" referred to herein can include software, hardware, or a combination thereof in an embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

The term "processing" as used herein includes filtering signals, decoding symbols, assembling data structures, transferring data structures, manipulating data structures, and reading and writing data structures. Data structures are defined to be information arranged as symbols, packets, blocks, files, input data, system generated data, such as calculated or generated data, and program data.

Referring now to FIG. 1, therein is shown a communication system 100 with whitening feedback mechanism in an embodiment of the present invention. The communication system 100 includes a mobile device 102, such as a cellular phone or a notebook computer, connected to a network 104. The network 104 is a system of wired or wireless communication devices that are connected to each other for enabling communication between devices.

For example, the network 104 can include a combination of wires, transmitters, receivers, antennas, towers, stations, repeaters, telephone network, servers, or client devices for a wireless cellular network. The network 104 can also include a combination of routers, cables, computers, servers, and client devices for various sized area networks.

The network 104 can include a base station 106 for directly linking and communicating with the mobile device 102. The base station 106 can receive wireless signals from the mobile device 102, transmit signals to the mobile device 102, process signals, or a combination thereof. The base station 106 can also relay signals between other base stations, components within the network 104, or a combination thereof.

The mobile device 102 can be connected to the network 104 through the base station 106. For example, the base station 106 can include or be coupled with a cell tower, a wireless router, an antenna, a processing device, or a combination thereof being used to send signals to or receive signals from the mobile device 102, such as a smart phone or a laptop computer.

The mobile device 102 can connect to and communicate with other devices, such as other mobile devices, servers, computers, telephones, or a combination thereof. The mobile device 102 can communicate with other devices by transmitting signals, receiving signals, processing signals, or a combination thereof and displaying a content of the signals, audibly recreating sounds according to the content of the signals, processing according to the content, such as storing an application or updating an operating system.

The base station 106 can be used to wirelessly exchange signals for communication, including voice signals of a telephone call or data representing a webpage and interactions therewith. The base station 106 can also transmit reference signals, training signals, error detection signals, error correction signals, header information, transmission format, protocol information, or a combination thereof.

Based on the communication method, such as code division multiple access (CDMA), orthogonal frequency-division multiple access (OFDMA), Third Generation Partnership Project (3GPP), Long Term Evolution (LTE), or fourth generation (4G) standards, the communication signals can include a reference portion, a header portion, a format portion, an error correction or detection portion, or a combination thereof imbedded in the communicated information. The reference portion, header portion, format portion, error correction or detection portion, or a combination thereof can include a predetermined bit, pulse, wave, symbol, or a combination thereof. The various portions can be embedded within the communicated signals at regular time intervals, frequency, code, or a combination thereof.

The base station 106 can communicate a communication content 108 by sending a transmitter signal 110 to the mobile device 102. The communication content 108 is data from a transmitting device intended for communication by reproduction or processing at a receiving device. For example, the communication content 108 can be a sequence of bits intended for displaying, audibly recreating, executing instructions, storing, or a combination thereof at a receiving device, such as the mobile station 102.

The base station 106 can modify the communication content 108 to generate and transmit the transmitter signal 110. The transmitter signal 110 is data actually transmitted by a device for communication and having a format for transmission. The base station 106 can generate the transmitter signal 110 by modifying, such as by interleaving or adding formatting information, the communication content 108 according to methods or standardizations predetermined by the communication system 100 to generate a code word 111. The code word 111 is a unit of information having a length predetermined by the communication system 100 for communicating information between devices.

For example, the transmitter signal 110 can be the code word 111 including a sequence of bits representing the communication content 108, an informational portion, a processing portion, an error correction portion, a format portion, or a combination thereof. Also for example, the transmitter signal 110 can be a sequence of symbols according to a modulation scheme, such as quadrature amplitude modulation (QAM) or phase-shift keying (PSK), corresponding to the sequence of bits.

The transmitter signal 110 can further include a reference portion 113. The reference portion 113 is a known signal transmitted by a device that is used to determine various types of information at a receiving device. The reference portion 113 can include a bit, a symbol, a signal pattern, a signal strength, frequency, phase, duration, or a combination thereof predetermined by the communication system 100, a standard, or a combination thereof. The details of the reference portion 113 can be known and used by one or all devices in the communication system 100.

The reference portion 113 can include generic information, cell-specific information, or a combination thereof. The reference portion 113 can further include information regarding a transmission format. The detail, the structure, the content, or a combination thereof for the reference portion 113 can be used by the receiving device, such as the mobile station 102, to determine information regarding a mechanism used to transmit data.

The transmitter signal 110 can arrive at the mobile station 102 after traversing a transmitter channel 112. The transmitter channel 112 can be wireless, wired, or a combination thereof.

The transmitter channel 112 can be a direct link between the mobile device 102 and the base station 106 or can include repeaters, amplifiers, or a combination thereof. For example, the transmitter channel 112 can include communication frequency, time slot, packet designation, transmission rate, channel code, or a combination thereof used for transmitting signals between the mobile device 102 and the base station 106.

The mobile station 102 can receive signals from other unintended sources. The mobile station 102 can receive an interference signal 114 including interference content 116 from an interference source 118. The interference content 116 is data unintended for communication at the receiving device. The interference content 116 can be similar to the communication content 108 as described above, but intended for communication with a different device 120 and received by the first device 102 or for a purpose not currently utilized by the first device 102.

The interference source 118 can be any source generating signals unintended for a specific receiver. The interference signal 114 is data actually transmitted by the interference source 118 for communication and having a format for transmission. The interference signal 114 can be similar to the transmitter signal 110 as described above, and include bits or symbols representing modifications, such as by interleaving or adding formatting information, for the interference content 116.

For example, the interference signal 114 can be transmissions intended for the difference device 106 but received at the mobile device 102. Also for example, the interference signal 114 can include signals intended for communication with the mobile station 102 for a currently unrelated purpose or for a function currently not accessed on the mobile station 102.

As a more specific example, the interference source 118 can include various transmitters, including a base station or a satellite dish, another mobile communication device, such as a smart phone or a laptop computer, broadcasting station, such as for television or radio, or a combination thereof. Also for example, the interference signal 114 can include wireless signals carrying voice or webpage information associated with a phone other than the mobile station 102 or broadcasted television signals when the mobile station 102 is not accessing the television viewing feature.

The interference signal 114 can traverse an interference channel 122 to arrive at the mobile station 102. The interference channel 122 can be similar to the transmitter channel 112 as described above, but for the differences in characteristics due to geographical differences between the base station 106 and the interference source 118, due to differences in method of communication or resources used between the transmitter signal 110 and the interference signal 114, or a combination thereof.

For example, the interference channel 122 can be wireless, wired, or a combination thereof. The interference channel 122 can be an unintended direct link between the mobile device 102 and the interference source 118, or include repeaters, amplifiers, or a combination thereof. Also for example, the interference channel 122 can include communication frequency, time slot, packet designation, transmission rate, channel code, or a combination thereof used for transmitting signals between the interference source and the different device 120, and further accessible by the mobile device 102.

The mobile station 102 can receive a receiver signal 124. The receiver signal 124 is information received by a device in the communication system 100. The receiver signal 124 can include the transmitter signal 110 that has been altered from traversing the transmitter channel 112. The receiver signal 124 can further include the interference signal 114 that has been altered from traversing the interference channel 122.

The communication system 100 can estimate a serving channel estimate 126 and an interference channel estimate 128 from the receiver signal 124. The serving channel estimate 126 is a description of changes to signals caused by the transmitter channel 112. The serving channel estimate 126 can describe and quantize reflection, loss, delay, refraction, obstructions, or a combination thereof a signal can experience while traversing between the base station 106 and the mobile device 102. The serving channel estimate 126 can be a matrix value characterizing the transmitter channel 112.

The interference channel estimate 128 is a description of changes to signals caused by the interference channel 122. The interference channel estimate 128 can describe and quantize reflection, loss, delay, refraction, obstructions, or a combination thereof a signal can experience while traversing between the interference source 118 and the mobile device 102. The interference channel estimate 128 can be a matrix value characterizing the interference channel 122.

For illustrative purposes, the communication system 100 is described as communicating by transmitting from the base station 106 and receiving at the mobile device 102. However, it is understood that the communication system 100 can also transmit from the mobile device 102 and receive at the base station 106.

Figure 2:
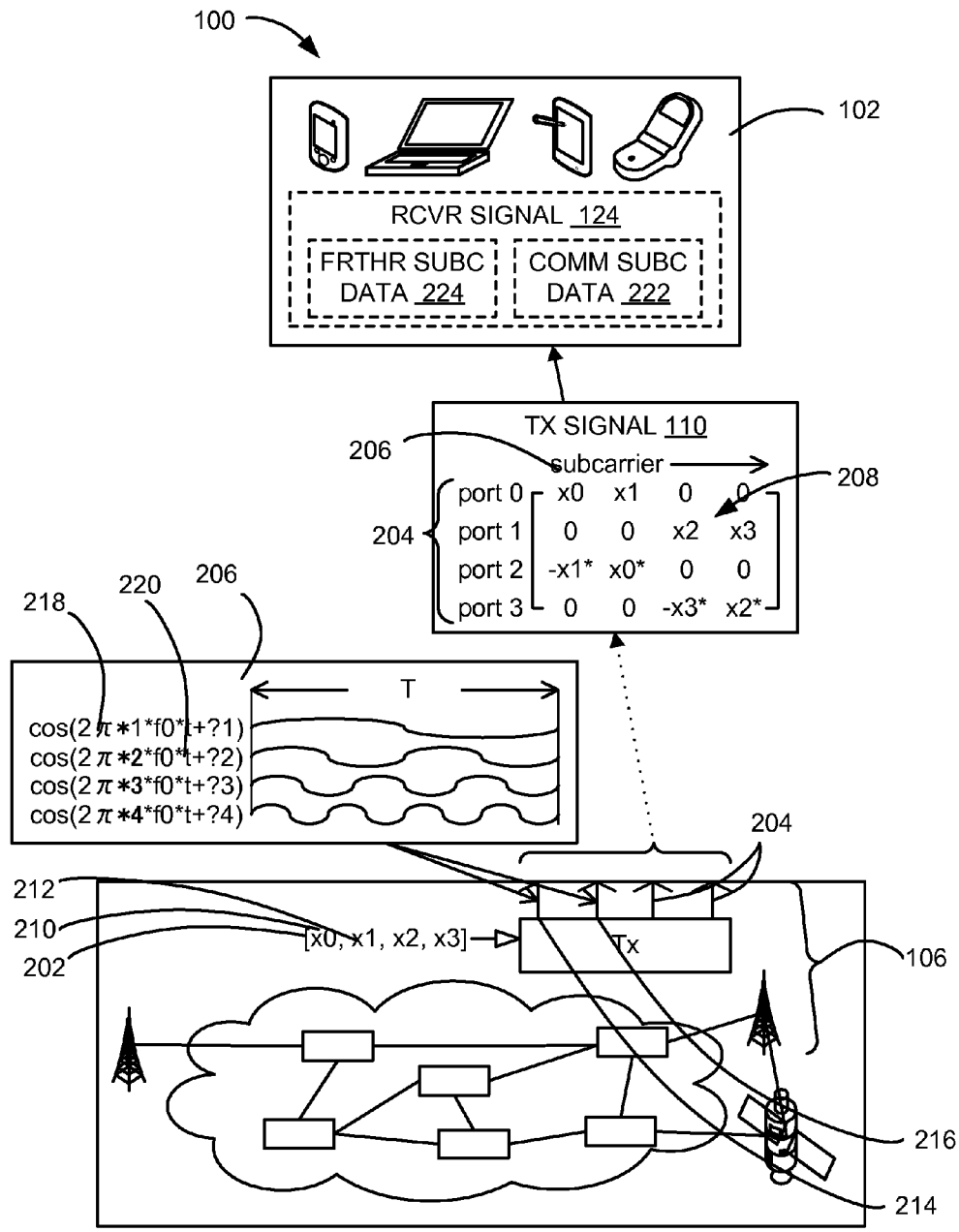
FIG. 2 is an exemplary communication between the base station and the mobile device.

Referring now to FIG. 2, therein is shown an exemplary communication between the base station 106 and the mobile device 102. The base station 106 can generate and transmit the transmission signal 110 corresponding to a word-set 202. The word-set 202 is a grouping of the code word 111 of FIG. 1. The word-set 202 can include the grouping including a quantity of code words, with the quantity corresponding to a number of antenna ports 204 being used to communicate the transmission signal 110.

The antenna ports 204 are paths or interfaces for accessing individual antennas for communicating with another device. The antenna ports 204 can each include or connect a device for radiating or receiving radio waves.

Each of the antenna ports can use subcarriers 206 for transmitting the transmission signal 110. The subcarriers 206 are a set of independent frequencies, phases, or a combination thereof for communicating with another device. The subcarriers 206 can be a set of frequencies that are orthogonal to each other.

The communication system 100 can use the subcarriers 206 and the antenna ports 204 to communicate the transmission signal 110. The base station 106 can use the subcarriers 206 and the antenna ports 204 to transmit the transmission signal 110.

The communication system 100 can use a space-frequency block-coding (SFBC) scheme 208. The space-frequency block-coding scheme 208 is a method for arranging instances of the code word 111 across multiple antennas and frequencies. The space-frequency block-coding scheme 208 can include a pattern for the instances of the code word 111 based on the quantity of the antenna ports 204.

For example, the base station 106 can include two instances of the antenna ports 204 for transmitting two instances of the code word 111. The base station 106 can transmit a communication word 210 and a further word 212 as the communication content 108 of FIG. 1 or exclusive portions therein. The base station 106 can transmit using a communication port 214 and a further port 216, with each port using a communication subcarrier 218 and a further subcarrier 220.

Continuing with the example, the space-frequency block-coding scheme 208 can be represented as:

$$\begin{array}{c} \text{port 0} \\ \text{port 1} \end{array} \begin{bmatrix} x_0 & x_1 \\ -x_1^* & x_0^* \end{bmatrix}. \qquad \text{Equation (1).}$$

The terms '$x_0$' and '$x_1$' can represent the communication word 210 and the further word 212, respectively, while '$x_0^*$' can represent a complex-conjugate of the communication word 210. The terms 'port 0' and 'port 1' can represent the communication port 214 and the further port 216, respectively. First column of matrix values in Equation (1) can correspond to instances of the code word 111 transmitted using the communication subcarrier 218. Second column of the matrix values in Equation (1) can correspond to instance of the code word 111 transmitted using the further subcarrier 220.

For illustrative purposes, the communication system 100 will be described as a multiple-input multiple-output (MIMO) system including two instances of the antenna ports 204 and using two instances of the subcarriers 206 for communicating two instances of the code word 111 in the word-set 202. However, it is understood that the communication system 100 can include a different configuration.

For example, the communication system 100 can include four antenna ports, four subcarriers, four code words, or a combination thereof as shown in FIG. 2. Also for example, the communication system 100 can have various combinations in number of antennas between the base station 106 and the mobile device 102, including single-input single output (SISO) system.

The mobile device 102 can receive the receiver signal 124 corresponding to the transmitter signal 110. The receiver signal 124 can include a communication subcarrier data 222 and a further subcarrier data 224. The communication subcarrier data 222 is a portion in the receiver signal 124 corresponding to the communication subcarrier 218. The communication subcarrier data 222 can be the data in the receiver signal 124 received through the communication port 214, the further port 216, or a combination thereof. The communication subcarrier data 222 can correspond to the communication word 210, the further word 212, a portion thereof, or a combination thereof.

The further subcarrier data 224 is a portion in the receiver signal 124 corresponding to the further subcarrier 220. The further subcarrier data 224 can be the data in the receiver signal 124 received through the communication port 214, the further port 216, or a combination thereof. The further subcarrier data 224 can correspond to the communication word 210, the further word 212, a portion thereof, or a combination thereof.

For illustrative purposes, above elements of the communication system 100 has been described for the transmitter signal 110 in communicating between the base station 106 and the mobile device 106. However, it is understood that the interference source 118 of FIG. 1 and the interference signal 114 can include the above described elements.

For example, the interference source 118 can include the antenna ports 204, use the subcarriers 206 for one or more of the antenna ports 204, or a combination thereof. The interference source 118 can transmit multiple instances of the code word 111, as independent data or according to the space-frequency block-coding scheme.

Focusing on the transmitter signal 110, the receiver signal 124 can be expressed as:

$$y_{n_r \times 1}(k) = H_{n_r \times n_t}(k) x_{n_t \times 1}(k) + v_{n_r \times 1}(k).$$  Equation (2).

For Equation (2), 'k' can represent an index for the subcarriers 206. For example, 'k' can represent a portion of the receiver signal 124 corresponding to the communication subcarrier 218, such as the communication subcarrier data 222, 'k+1' or 'k'' can represent a portion of the receiver signal 124 corresponding to the further subcarrier, such as the further subcarrier data 224, or a combination thereof.

Further, the term '$n_t$' can represent a quantity of antennas on a transmitting device, such as the base station 106 or the interference source 118, while '$n_r$' can represent a quantity of antennas on a receiving device, such as the mobile device 102. The term '$x_{n_t \times 1}(k)$' can represent a transmitted symbol vector, such as in the interference signal 114 or the transmitter signal 110, having a size of '$n_t \times 1$', while the term '$y_{n_r \times 1}(k)$' can represent a received symbol vector, such as in the receiver signal 124, having a size of '$n_r \times 1$'.

Moreover, the term, $H_{n_r \times n_t}(k)$ can represent an equivalent channel matrix having a size '$n_r \times n_t$', such as for the serving channel estimate 126 of FIG. 1, the interference channel estimate 128 of FIG. 1, or a combination thereof. The (i, j)th element for '$H_{n_r \times n_t}(k)$' can be denoted by '$h_{i,j}(k)$'. The term '$v_{n_r \times 1}(k)$' can represent a circularly-symmetric complex Gaussian (CSCG) random noise vector having a size of '$n_r \times 1$'.

The communication system 100 can comprehensively or jointly process the communication subcarrier data 222 and the further subcarrier data 224 when the transmitter signal 110, the interference signal 114, or a combination thereof is transmitted according to the space-frequency block-coding scheme 208. The communication system 100 can comprehensively or jointly calculate covariance, whiten, detect, decode, or a combination thereof for data transmitted across the subcarriers 206 according to the space-frequency block-coding scheme 208.

For example, data transmitted over the communication subcarrier 218 and the further subcarrier 220, such as the communication subcarrier data 222 and the further subcarrier data 224, can be processed together rather than independently or separately processing the different sets of data. As a more specific example, a set of processing steps or circuits can process, such as calculating, whitening, detecting, decoding, or a combination of processes based on both the communication subcarrier data 222 and the further subcarrier data 224.

The communication system 100 can comprehensively or jointly process each set of data transmitted over the subcarriers 206 instead of independently or separately processing the each set of data transmitted over the subcarriers 206, such as using iterations or parallel processing separately corresponding to each set of the data. Details regarding the comprehensive or joint processing of data transmitted according to the space-frequency block-coding scheme 208 will be discussed below.

Figure 3:
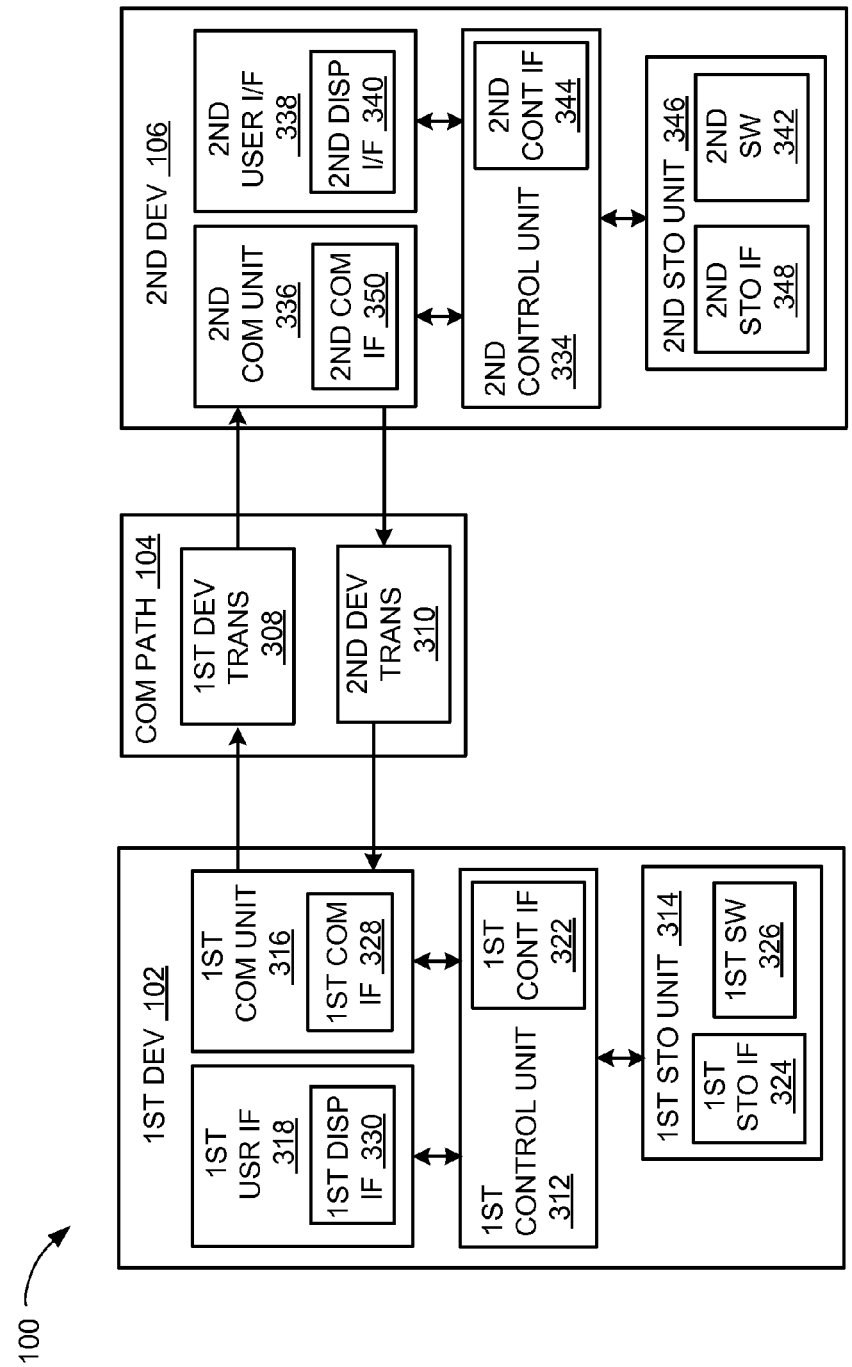
FIG. 3 is an exemplary block diagram of the communication system.

Referring now to FIG. 3, therein is shown an exemplary block diagram of the communication system 100. The communication system 100 can include the first device 102, the communication path 104, and the second device 106. The first device 102 can send information in a first device transmission 308 over the communication path 104 to the second device 106. The second device 106 can send information in a second device transmission 310 over the communication path 104 to the first device 102.

For illustrative purposes, the communication system 100 is shown with the first device 102 as a client device, although it is understood that the communication system 100 can have the first device 102 as a different type of device. For example, the first device 102 can be a server having a display interface.

Also for illustrative purposes, the communication system 100 is shown with the second device 106 as a server, although it is understood that the communication system 100 can have the second device 106 as a different type of device. For example, the second device 106 can be a client device.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control unit 312, a first storage unit 314, a first communication unit 316, and a first user interface 318. The first control unit 312 can include a first control interface 322. The first control unit 312 can execute a first software 326 to provide the intelligence of the communication system 100.

The first control unit 312 can be implemented in a number of different manners. For example, the first control unit 312 can be a processor, an application specific integrated circuit (ASIC) an embedded processor, a microprocessor, a hardware control logic, a hardware finite state machine (FSM), a digital signal processor (DSP), or a combination thereof. The first control interface 322 can be used for communication between the first control unit 312 and other functional units in the first device 102. The first control interface 322 can also be used for communication that is external to the first device 102.

The first control interface 322 can receive information from the other functional units or from external sources, or can transmit information to the other functional units or to external destinations. The external sources and the external destinations refer to sources and destinations external to the first device 102.

The first control interface 322 can be implemented in different ways and can include different implementations depending on which functional units or external units are being interfaced with the first control interface 322. For example, the first control interface 322 can be implemented with a pressure sensor, an inertial sensor, a microelectromechanical system (MEMS), optical circuitry, waveguides, wireless circuitry, wireline circuitry, or a combination thereof.

The first storage unit 314 can store the first software 326. The first storage unit 314 can also store the relevant information, such as data representing incoming images, data representing previously presented image, sound files, or a combination thereof.

The first storage unit 314 can be a volatile memory, a nonvolatile memory, an internal memory, an external memory, or a combination thereof. For example, the first storage unit 314 can be a nonvolatile storage such as non-volatile random access memory (NVRAM), Flash memory, disk storage, or a volatile storage such as static random access memory (SRAM).

The first storage unit 314 can include a first storage interface 324. The first storage interface 324 can be used for communication between and other functional units in the first device 102. The first storage interface 324 can also be used for communication that is external to the first device 102.

The first storage interface 324 can receive information from the other functional units or from external sources, or can transmit information to the other functional units or to external destinations. The external sources and the external destinations refer to sources and destinations external to the first device 102.

The first storage interface 324 can include different implementations depending on which functional units or external units are being interfaced with the first storage unit 314. The first storage interface 324 can be implemented with technologies and techniques similar to the implementation of the first control interface 322.

The first communication unit 316 can enable external communication to and from the first device 102. For example, the first communication unit 316 can permit the first device 102 to communicate with the second device 106 of FIG. 1, an attachment, such as a peripheral device or a computer desktop, and the communication path 104.

The first communication unit 316 can also function as a communication hub allowing the first device 102 to function as part of the communication path 104 and not limited to be an end point or terminal unit to the communication path 104. The first communication unit 316 can include active and passive components, such as microelectronics or an antenna, for interaction with the communication path 104.

The first communication unit 316 can include a first communication interface 328. The first communication interface 328 can be used for communication between the first communication unit 316 and other functional units in the first device 102. The first communication interface 328 can receive information from the other functional units or can transmit information to the other functional units.

The first communication interface 328 can include different implementations depending on which functional units are being interfaced with the first communication unit 316. The first communication interface 328 can be implemented with technologies and techniques similar to the implementation of the first control interface 322.

The first user interface 318 allows a user (not shown) to interface and interact with the first device 102. The first user interface 318 can include an input device and an output device. Examples of the input device of the first user interface 318 can include a keypad, a touchpad, soft-keys, a keyboard, a microphone, an infrared sensor for receiving remote signals, or any combination thereof to provide data and communication inputs.

The first user interface 318 can include a first display interface 330. The first display interface 330 can include a display, a projector, a video screen, a speaker, or any combination thereof.

The first control unit 312 can operate the first user interface 318 to display information generated by the communication system 100. The first control unit 312 can also execute the first software 326 for the other functions of the communication system 100. The first control unit 312 can further execute the first software 326 for interaction with the communication path 104 via the first communication unit 316.

The second device 106 can be optimized for implementing an embodiment of the present invention in a multiple device embodiment with the first device 102. The second device 106 can provide the additional or higher performance processing power compared to the first device 102. The second device 106 can include a second control unit 334, a second communication unit 336, and a second user interface 338.

The second user interface 338 allows a user (not shown) to interface and interact with the second device 106. The second user interface 338 can include an input device and an output device. Examples of the input device of the second user interface 338 can include a keypad, a touchpad, soft-keys, a keyboard, a microphone, or any combination thereof to provide data and communication inputs. Examples of the output device of the second user interface 338 can include a second display interface 340. The second display interface 340 can include a display, a projector, a video screen, a speaker, or any combination thereof.

The second control unit 334 can execute a second software 342 to provide the intelligence of the second device 106 of the communication system 100. The second software 342 can operate in conjunction with the first software 326. The second control unit 334 can provide additional performance compared to the first control unit 312.

The second control unit 334 can operate the second user interface 338 to display information. The second control unit 334 can also execute the second software 342 for the other functions of the communication system 100, including operating the second communication unit 336 to communicate with the first device 102 over the communication path 104.

The second control unit 334 can be implemented in a number of different manners. For example, the second control unit 334 can be a processor, an embedded processor, a microprocessor, hardware control logic, a hardware finite state machine (FSM), a digital signal processor (DSP), or a combination thereof.

The second control unit 334 can include a second control interface 344. The second control interface 344 can be used for communication between the second control unit 334 and other functional units in the second device 106. The second control interface 344 can also be used for communication that is external to the second device 106.

The second control interface 344 can receive information from the other functional units or from external sources, or can transmit information to the other functional units or to external destinations. The external sources and the external destinations refer to sources and destinations external to the second device 106.

The second control interface 344 can be implemented in different ways and can include different implementations depending on which functional units or external units are being interfaced with the second control interface 344. For example, the second control interface 344 can be implemented with a pressure sensor, an inertial sensor, a microelectromechanical system (MEMS), optical circuitry, waveguides, wireless circuitry, wireline circuitry, or a combination thereof.

A second storage unit 346 can store the second software 342. The second storage unit 346 can also store the such as data representing incoming images, data representing previously presented image, sound files, or a combination thereof. The second storage unit 346 can be sized to provide the additional storage capacity to supplement the first storage unit 314.

For illustrative purposes, the second storage unit 346 is shown as a single element, although it is understood that the second storage unit 346 can be a distribution of storage elements. Also for illustrative purposes, the communication system 100 is shown with the second storage unit 346 as a single hierarchy storage system, although it is understood that the communication system 100 can have the second storage unit 346 in a different configuration. For example, the second storage unit 346 can be formed with different storage technologies forming a memory hierarchal system including different levels of caching, main memory, rotating media, or off-line storage.

The second storage unit 346 can be a volatile memory, a nonvolatile memory, an internal memory, an external memory, or a combination thereof. For example, the second storage unit 346 can be a nonvolatile storage such as nonvolatile random access memory (NVRAM), Flash memory, disk storage, or a volatile storage such as static random access memory (SRAM).

The second storage unit 346 can include a second storage interface 348. The second storage interface 348 can be used for communication between other functional units in the second device 106. The second storage interface 348 can also be used for communication that is external to the second device 106.

The second storage interface 348 can receive information from the other functional units or from external sources, or can transmit information to the other functional units or to external destinations. The external sources and the external destinations refer to sources and destinations external to the second device 106.

The second storage interface 348 can include different implementations depending on which functional units or external units are being interfaced with the second storage unit 346. The second storage interface 348 can be implemented with technologies and techniques similar to the implementation of the second control interface 344.

The second communication unit 336 can enable external communication to and from the second device 106. For example, the second communication unit 336 can permit the second device 106 to communicate with the first device 102 over the communication path 104.

The second communication unit 336 can also function as a communication hub allowing the second device 106 to function as part of the communication path 104 and not limited to be an end point or terminal unit to the communication path 104. The second communication unit 336 can include active and passive components, such as microelectronics or an antenna, for interaction with the communication path 104.

The second communication unit 336 can include a second communication interface 350. The second communication interface 350 can be used for communication between the second communication unit 336 and other functional units in the second device 106. The second communication interface 350 can receive information from the other functional units or can transmit information to the other functional units.

The second communication interface 350 can include different implementations depending on which functional units are being interfaced with the second communication unit 336. The second communication interface 350 can be implemented with technologies and techniques similar to the implementation of the second control interface 344.

The first communication unit 316 can couple with the communication path 104 to send information to the second device 106 in the first device transmission 308. The second device 106 can receive information in the second communication unit 336 from the first device transmission 308 of the communication path 104.

The second communication unit 336 can couple with the communication path 104 to send information to the first device 102 in the second device transmission 310. The first device 102 can receive information in the first communication unit 316 from the second device transmission 310 of the communication path 104. The communication system 100 can be executed by the first control unit 312, the second control unit 334, or a combination thereof. For illustrative purposes, the second device 106 is shown with the partition having the second user interface 338, the second storage unit 346, the second control unit 334, and the second communication unit 336, although it is understood that the second device 106 can have a different partition. For example, the second software 342 can be partitioned differently such that some or all of its function can be in the second control unit 334 and the second communication unit 336. Also, the second device 106 can include other functional units not shown in FIG. 3 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the communication system 100 is described by operation of the first device 102 and the second device 106. It is understood that the first device 102 and the second device 106 can operate any of the modules and functions of the communication system 100.

Figure 4:
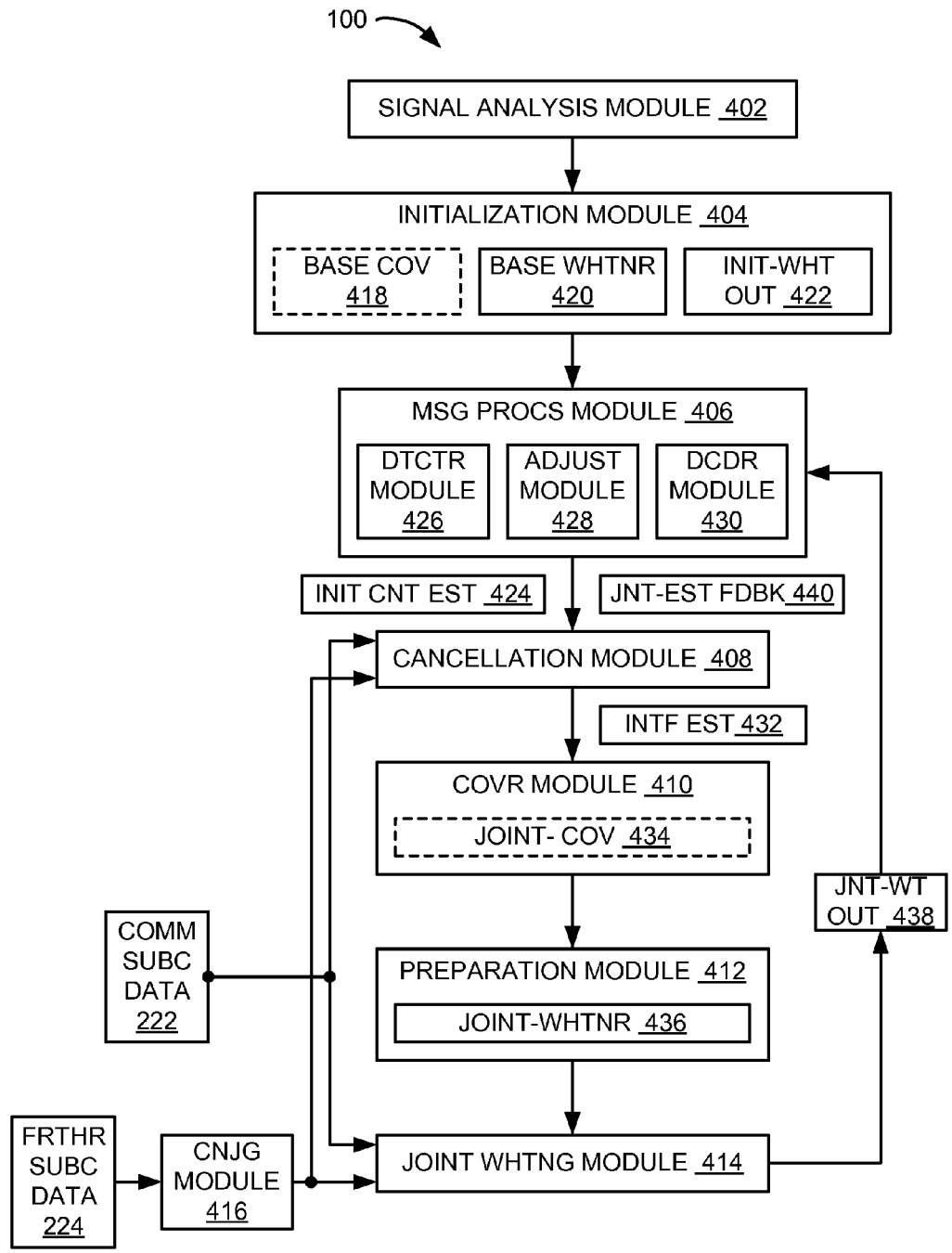
FIG. 4 is a control flow of the communication system.

Referring now to FIG. 4, therein is shown a control flow of the communication system 100. The communication system 100 can include a signal analysis module 402, an initialization module 404, a message processing module 406, a cancellation module 408, a covariance module 410, a preparation module 412, a joint whitening module 414, and a conjugation module 416.

The signal analysis module 402 can be coupled to the initialization module 404, the cancellation module 408, the joint whitening module 414, or a combination thereof. The initialization module 404 can be coupled to the message processing module 406, which can be further coupled to the cancellation module 408. The cancellation module 408 can be coupled to the covariance module 410, which can be further coupled to the preparation module 412. The preparation module 412 can be coupled to the joint whitening module 414, which can be further coupled to the message processing module 406.

The modules can be coupled to each other in a variety of ways. For example, one or more outputs from one module, such as the message processing module 406 or the covariance module 410, can be connected to one or more inputs of another module, such as the cancellation module 408 or the preparation module 412.

The signal analysis module 402 is configured to receive the receiver signal 124 of FIG. 1. The signal analysis module 402 can receive the receiver signal 124 corresponding to the transmitter signal 110 of FIG. 1, the interference signal 114 of FIG. 1, or a combination thereof. The signal analysis module 402 can receive the receiver signal 124 for communicating the transmitter signal 110 corresponding to the communication content 108 of FIG. 1. The interference signal 114 can be received incidental to receiving the transmitter signal 110.

The signal analysis module 402 by can receive the receiver signal 124 by recording the changes detected through the receiving antennas. The signal analysis module 402 can sample the voltage levels produced by the antennas in response to change in electro-magnetic flux levels.

The signal analysis module 402 can identify the reference portion 113 of FIG. 1 in the receiver signal 124. The signal analysis module 402 can identify the reference portion 113 based on the bit, the symbol, the signal pattern, the signal strength, the frequency, the phase, the duration, or a combination thereof as predetermined by the communication system 100, a standard, or a combination thereof.

The signal analysis module 402 can identify a message portion, exclusive of the reference portion 113, corresponding to the word-set 202 of FIG. 2, the subcarriers 206 of FIG. 2, the antenna ports 204 of FIG. 2, or a combination thereof. The signal analysis module 402 can further identify the message portion corresponding to the transmitter signal 110, the interference signal 114, or a combination thereof.

The signal analysis module 402 can receive the receiver signal 124 including signals transmitted based on the space-frequency block-coding scheme 208 of FIG. 2. The signal analysis module 402 can receive the receiver signal 124 having the communication subcarrier data 222 of FIG. 2, the further subcarrier data 224 of FIG. 2, or a combination thereof. The communication subcarrier data 222 and the further subcarrier data 224 can be included in the transmitter signal 110, the interference signal 114, or a combination thereof for implementing the space-frequency block-coding scheme 208.

The signal analysis module 402 can receive the receiver signal 124 having portions therein corresponding to the communication content 108 having the communication word 210 of FIG. 2, the further word 212 of FIG. 2, or a combination thereof. The signal analysis module 402 can receive the receiver signal 124 in a variety of ways.

For example, the signal analysis module 402 can receive the receiver signal 124 for jointly processing one, two, or greater multiple instances of the code word 111 of FIG. 1. Also for example, the communication word 210 can be transmitted over an instance of the subcarriers 206 and correspond to the communication subcarrier data 222, and the further word 212 can be transmitted over a different instance of the subcarriers 206 and correspond to the further subcarrier data 224 based on the space-frequency block-coding scheme 208.

The receiver signal 124 including the transmitter signal 110 and the interference signal 114 can be represented as:

$$y(k)=H(k)x(k)+G(k)z(k)+v(k).$$ Equation (3).

The receiver signal 124 can be represented as 'y(k)', the serving channel estimate 126 of FIG. 1 can be represented by 'H(k)', and the communication content 108 can be represented by 'x(k)' Also, the interference channel estimate 128 of FIG. 1 can be represented as 'G(k)' and the interference content 116 of FIG. 1 can be represented as 'z(k)'. The noise portion can be represented by 'v(k)'. The terms in Equation (3) can be Equation (2) represented for both the transmitter signal 110 and the interference signal 114.

The signal analysis module 402 can further characterize one or more channels using the receiver signal 124 or a portion therein, such as the message portion, the reference portion 113, or a combination thereof. The signal analysis module 402 can characterize the transmitter channel 112 of FIG. 1, the interference channel 122 of FIG. 1, or a combination thereof. The signal analysis module 402 can to characterize the transmitter channel 112, the interference channel 122, or a combination thereof by estimating the serving channel estimate 126, the interference channel estimate 128, or a combination thereof.

The signal analysis module 402 can estimate the serving channel estimate 126, the interference channel estimate 128, or a combination thereof using a variety of methods. For example, the signal analysis module 402 can use the reference portion 113 transmitted by the base station 106 of FIG. 1 to estimate the serving channel estimate 126. The signal analysis module 402 can use the reference portion 113 transmitted by the interference source 118 of FIG. 1 to estimate the serving channel estimate 126.

Continuing with the example, the details regarding the reference portion 113, such as original frequency, phase, content, shape, or a combination thereof, can be predetermined by the communication standard, the communication system 100, or a combination thereof. The signal analysis module 402 can compare the received instances of the reference communication to the predetermined parameters for the reference portion 113. The signal analysis module 402 can use frequency or time domain transformation, convolution, transposition, basic mathematical operations, or a combination thereof with the predetermined or received instances of the reference communication, or both Continuing with the example, the signal analysis module 402 can further calculate the changes in magnitude, frequency, phase, or a combination thereof in the reference portion 113 in the receiver signal 124 corresponding to the transmitter signal 110, the interference signal 114, or a combination thereof. The signal analysis module 402 can use various models, such as Rayleigh fading model or additive white Gaussian model, to estimate the serving channel estimate 126, the interference channel estimate 128, or a combination thereof.

The signal analysis module 402 can adjust the receiver signal 124 by cancelling or discarding portions therein. For example, the signal analysis module 402 can cancel or discard cell-specific reference signal (CRS) information in the reference portion 113. Also for example, the signal analysis module 402 can separate the reference portion 113 out of the receiver signal 124 and have the receiver signal 124 represent remaining portions or only the message portion.

The signal analysis module 402 can receive the receiver signal 124 using the first communication unit 316 of FIG. 3, the second communication unit 336 of FIG. 3, or a combination thereof. The signal analysis module 402 can use the first control unit 312 of FIG. 3, the second control unit 334 of FIG. 3, the first communication unit 316, the second communication unit 336, or a combination thereof to estimate the serving channel estimate 126, the interference channel estimate 128, or a combination thereof. The signal analysis module 402 can store the serving channel estimate 126, the interference channel estimate 128, the receiver signal 124, the reference portion 113, or a combination thereof in the first storage unit 314 of FIG. 3, the second storage unit 346 of FIG. 3, or a combination thereof.

After receiving the receiver signal 124, the control flow can be passed from the signal analysis module 402 to the initialization module 402. The control flow can be passed by having processing results of the signal analysis module 402, such as the serving channel estimate 126, the interference channel estimate 128, the reference portion 113 or a combination thereof, pass from the signal analysis module 402 as input to the initialization module 404, by storing the processing results at a location known and accessible to the initialization module 404, by notifying the initialization module 404, such as by using a flag, an interrupt, a status signal, or a combination, or a combination of processes thereof.

The signal analysis module 402 can similarly pass to the receiver signal 124 representing the message portion, the transmitter signal 110, the interference signal 114, the communication word 210, the further word 212, the communication subcarrier data 222, the further subcarrier data 224, or a combination thereof to the cancellation module 408, the joint whitening module 414, or a combination thereof. The detailed operations of the cancellation module 408 and the joint whitening module 414 will be described below.

The initialization module 404 is configured to initially whiten the receiver signal 124. The initialization module 404 can initially whiten the receiver signal 124 without accounting for correlations in values caused by the space-frequency block-coding scheme 208. For example, the initialization module 404 can whiten the receiver signal 124 by independently processing for data corresponding to each of the subcarriers 206, such as by using iterations of the same processes or multiple identical circuits.

Also for example, the initialization module 404 can calculate a base covariance 418. The base covariance 418 is a measure of a relationship between interference and noise without accounting for the space-frequency block-coding scheme 208. The base covariance 418 can be calculated based on the reference portion 113 corresponding to the transmitter signal 110, the reference portion 113 corresponding to the interference signal 114, the receiver signal 124, or a combination thereof.

Continuing with the example, the initialization module 404 can calculate the base covariance 418 using:

$$R(k)=E\{(G(k)z(k)+v(k))(G(k)z(k)+v(k))^H\}=G(k)G^H(k)+\sigma^2 I_{n_r}.\qquad\text{Equation (4)}.$$

The '$I_{n_r}$' term can represent an identity matrix and '$\sigma^2$' can represent a noise variance. The initialization module 404 can calculate the base covariance 418 based on the interference channel estimate 128, represented by '$G(k)$', the reference portion 113 corresponding to the interference signal 114, the interference signal 114, or a combination thereof.

Continuing with the example, the initialization module 404 can generate a base whitener 420 based on the base covariance 418. The base whitener 420 is a value or a set of values used in the whitening process for the interference signal 114 without accounting for the space-frequency block-coding scheme 208.

Continuing with the example, the base whitener 420 can randomize the communication subcarrier data 222 or the further subcarrier data 224 of the interference signal 114 when the receiver signal 124 or a portion therein corresponding the whitening process is transmitted without using the space-frequency block-coding scheme 208. The base whitener 420 can be for separately processing portions in the receiver signal 124 corresponding to the subcarriers 206 and further whiten the receiver signal 124 with the base whitener 420 for initially processing the receiver signal 124.

Continuing with the example, a covariance, including the base covariance 418, can be expressed as:

$$R(k)=L(k)L^H(k).\qquad\text{Equation (5)}.$$

The term '$L(k)$' can represent a lower-triangular matrix. The initialization module 404 can calculate the lower-triangular matrix by computing the Cholesky decomposition of the base covariance 418. Further, the initialization module 404 can generate the base whitener 420 using:

$$W(k)=L^{-1}(k).\qquad\text{Equation (6)}.$$

The term '$W(k)$' can represent a whitener, such as the base whitener 420.

Continuing with the example, the initialization module 404 can whiten the receiver signal 124 by combining the receiver signal 124, corresponding to the message portion and without the reference portion 113, and the base whitener 420. The initialization module 404 can apply multiplication, addition, matrix operation, or a combination thereof to combine the receiver signal 124 and the base whitener 420. The initialization module 404 can generate an initial-whitening output 422 as the result of combining the receiver signal 124 and the base whitener 420.

The initialization module 404 can use the first control unit 312, the second control unit 334, the first communication unit 316, the second communication unit 336, or a combination thereof to generate the initial-whitening output 422 using the base whitener 420 and the base covariance 418. The initialization module 404 can store the processing results, intermediate values, or a combination thereof in the first storage unit 314, the second storage unit 346, or a combination thereof.

After initially whitening the receiver signal 124, the control flow can pass from the initialization module 404 to the message processing module 406. The control flow can pass similarly as described above between the signal analysis module 402 and the initialization module 404 but using processing results of the initialization module 404 instead of results of the signal analysis module 402.

The message processing module 406 is configured to determine a bit, a symbol, or a combination thereof originally transmitted and intended for communication between the base station 106 and the mobile device 102 of FIG. 1. The message processing module 406 can determine the communication content 108 from the receiver signal 124. The message processing module 406 can, detect, decode, interleave, de-interleave, or a combination thereof. The message processing module 406 can further use an iterative process to determine the communication content 108.

The message processing module 406 can initially determine an initial content estimate 424. The initial content estimate 424 is an estimation of a bit, a symbol, or a combination thereof in the communication content 108. The initial content estimate 424 can be determined at a first iteration, without using any prior processing results, or a combination thereof. The initial content estimate 424 can be determined following a power-on state, a reset state, a handover process, a transmission of a new communication block, or a combination thereof for the mobile device 102.

The message processing module 406 can determine the initial content estimate 424 based on the initial-whitening output 422 generated from the initialization module 404 based on whitening the receiver signal 124 using the base covariance 418 and the base whitener 420, without accounting for the space-frequency block-coding scheme 208. The message processing module 406 can include a detector module 426, an adjustment module 428, and a decoder module 430 for determining the communication content 108.

The detector module 426 is configured to analyze for individual symbols or bits within the receiver signal 124, or a derivation thereof. For example, the detector module 426 can analyze the initial-whitening output 422 for calculating the initial content estimate 424. Also for example, the detector module 426 can perform the initial analysis for the receiver signal 124, a derivation thereof, a portion therein, or a combination thereof to determine a likely match for the individual symbol or bit originally transmitted in the transmitter signal 110 for the communication content 108.

The detector module 426 can analyze the receiver signal 124, a derivation thereof, a portion therein, or a combination thereof, including the initial-whitening output 422, by detecting a possible value of the bit or the symbol. The detector module 426 can detect by calculating a likelihood that the receiver signal 124, a derivation thereof, a portion therein, or a combination thereof corresponds to a specific value for the bit or the symbol. The detector module 426 can also calculate a set of likelihoods for the receiver signal 124, a derivation thereof, a portion therein, or a combination thereof corresponding to each of the possible values for the bit or the symbol.

The detector module 426 can calculate various likelihood-based values. The detector module 426 can further use values from other modules, such as the adjustment module 428 or the decoder module 430, from previous iterations, or a combination thereof. Details regarding the detector module 426 will be discussed below.

The adjustment module 428 is configured to rearrange portions of the receiver signal 124 for determining the communication content 108. The adjustment module 428 can interleave, de-interleave, or a combination thereof for the portions of the receiver signal 124 corresponding to each of the bits or the symbols.

The adjustment module 428 can interleave, de-interleave, or a combination thereof according to various coding schemes, such as a turbo-coding scheme or a polar coding scheme. The adjustment module 428 can have details for interleaving, de-interleaving, or a combination thereof predetermined by the communication system 100, a communication standard, or a combination thereof.

The adjustment module 428 can further calculate a difference in likelihood values. The adjustment module 428 can calculate the difference between outputs of the detector module 426 and the decoder module 430, outputs from previous iterations, or a combination thereof. The adjustment module 428 can further pass the difference values to the detector module 426, the decoder module 430, or a combination thereof. Details regarding the adjustment module 428 will be discussed below.

The decoder module 430 is configured to further analyze for individual symbols or bits within the receiver signal 124, or a derivation thereof. For example, the decoder module 430 can further analyze the initial-whitening output 422, output of the detector module 426, output of the adjustment module 428, or a combination thereof for calculating the initial content estimate 424. Also for example, the detector module 426 can perform the further analysis for the receiver signal 124, a derivation thereof, a portion therein, or a combination thereof to determine a likely match for the individual symbol or bit originally transmitted in the transmitter signal 110 for the communication content 108

The decoder module 430 can analyze the receiver signal 124, a derivation thereof, a portion therein, or a combination thereof, including the initial-whitening output 422, by decoding a possible value of the bit or the symbol. The decoder module 430 can detect by calculating a further likelihood that the receiver signal 124, a derivation thereof, a portion therein, or a combination thereof corresponds to a specific value for the bit or the symbol. The decoder module 430 can also calculate a further set of likelihoods for the receiver signal 124, a derivation thereof, a portion therein, or a combination thereof corresponding to each of the possible values for the bit or the symbol.

The decoder module 430 can calculate various likelihood-based values. The decoder module 430 can further use values from other modules, such as the adjustment module 428 or the detector module 426, from previous iterations, or a combination thereof. Details regarding the decoder module 430 will be discussed below.

The message processing module 406 can determine the value bit or the symbol having the highest likelihood value, exceeding a threshold value, or a combination thereof as being included in the communication content 108. The message processing module 406 can order a sequence of the values of the bits or symbols having satisfactory likelihoods to form a possible instance of the code word 111.

The message processing module 406 can determine the sequence of values as the communication content 108 when the possible instances of the code word 111 pass an error checking process, such as cyclic redundancy check (CRC) or low-density parity-check (LDPC). Further, the message processing module 406 can determine the possible of instance the code word 111 passing the error check as the code word 111, such as the communication word 210 or the further word 212, originally transmitted by the base station 106. The method or process for the error check can be predetermined by the communication system 100, the communication standards, or a combination thereof.

The message processing module 406 can further determine the initial content estimate 424 as the result of the detection and decoding process. For example, the message processing module 406 can determined the initial content estimate 424 as the communication word 210, the bit or symbol therein as determined satisfactory by the message processing module 406, the code word 111 passing the error check, or a combination thereof.

The message processing module 406, including the detector module 426, the adjustment module 428, the decoder module 430, or a combination thereof can use the first control unit 312, the second control unit 334, the first communication unit 316, the second communication unit 336, or a combination thereof to determine the initial content estimate 424 based on the initial-whitening output 422. The message processing module 406, including one or more of its sub-modules, can store the initial content estimate 424 in the first storage unit 314, the second storage unit 346, or a combination thereof.

After determining the initial content estimate 424, the control flow can pass from the message processing module 406 to the conjugation module 416. The control flow can pass similarly as described above between the signal analysis module 402 and the initialization module 404 but using processing results of the message processing module 406 instead of results of the signal analysis module 402.

The conjugation module 416 is configured to conjugate a set of data received from one of the subcarriers 206 when the space-frequency block-coding scheme 208 is used. The conjugation module 416 can conjugate either the communication subcarrier data 222 or the further subcarrier data 224. The conjugation module can conjugate the data by altering frequency, phase, negating signs for values or portions of values, such as the portion corresponding to imaginary numbers.

For illustrative purpose, the communication system 100 will be discussed as conjugating the further subcarrier data 224. However, it is understood that the communication system 100 can conjugate the communication subcarrier data 222 instead of the further subcarrier data 224.

After conjugating the further subcarrier data 224, the control flow can pass from the conjugation module 416 to the cancellation module 408. The control flow can pass similarly as described above between the signal analysis module 402 and the initialization module 404 but using processing results of the conjugation module 416 instead of results of the signal analysis module 402.

The cancellation module 408 is configured to estimate the interference signal 114 or the interference content 116. The cancellation module 408 can estimate the interference signal 114 in the receiver signal 124 by calculating an interference estimate 432. The cancellation module 408 can calculate the interference estimate 432 based on the initial content estimate 424.

For example, the cancellation module 408 can calculate the interference estimate 432 by cancelling the initial content estimate 424 from the receiver signal 124 or a portion therein, such as the communication subcarrier data 222, the further subcarrier data 224, a conjugation thereof, or a combination thereof. Also for example, the cancellation module 408 can calculate the interference estimate 432 as a difference between the initial content estimate 424, for estimating the transmitter signal 110 or a portion therein, and the receiver signal 124, a portion therein, a derivation thereof, or a combination thereof.

The cancellation module 408 can use the first control unit 312, the second control unit 334, the first communication unit 316, the second communication unit 336, or a combination thereof to calculate the interference estimate 432. The cancellation module 408 can store the interference estimate 432 in the first storage unit 314, the second storage unit 346, or a combination thereof.

After calculating the interference estimate 432, the control flow can pass from the cancellation module 408 to the covariance module 410. The control flow can pass similarly as described above between the signal analysis module 402 and the initialization module 404 but using processing results of the cancellation module 408 instead of results of the signal analysis module 402.

The covariance module 410 is configured to calculate covariance of signals while accounting for transmissions based on the space-frequency block-coding scheme 208. The covariance module 410 can calculate a joint-covariance 434.

The joint-covariance 434 is a measure of a relationship between interference and noise when a signal is transmitted using the space-frequency block-coding scheme 208. The joint-covariance 434 can be calculated based on the receiver signal 124, data corresponding to the subcarriers 206 therein, or a combination thereof. The communication system 100 can use the joint-covariance 434 when the interference source 118 transmits the interference signal 114 using the space-frequency block-coding scheme 208.

The covariance module 410 can calculate the joint-covariance 434 based on the interference estimate 432. The covariance module 410 can calculate the joint-covariance 434 corresponding to the communication subcarrier data 222 and the further subcarrier data 224 of the interference signal 114 represented by the interference estimate 432. The joint-covariance 434 can be for processing the receiver signal 124 corresponding to the interference signal 114 transmitted according to the space-frequency block-coding scheme 208.

When the interference signal 114 is based on the space-frequency block-coding scheme 208, the covariance module 410 can calculate the joint-covariance 434 using:

$$R_{\bar{v}}(k) = E\{\bar{v}(k)\bar{v}^H(k)\} = \begin{bmatrix} g_0(2k) & -g_1(2k) \\ g_1^*(2k+1) & g_0^*(2k+1) \end{bmatrix} \begin{bmatrix} g_0(2k) & -g_1(2k) \\ g_1^*(2k+1) & g_0^*(2k+1) \end{bmatrix}^H + \sigma^2 I_{n_r}. \quad \text{Equation (7)}.$$

The terms '$g_0$' and '$g_1$' can each represent to a transmission layer for the interference signal 114. The index '$2k$' and '$2k+1$' can each represent to the instances of the subcarriers 106 for the interference signal 114. The term ' ' can represent a variance in noise detected by the mobile station 102. The covariance module 410 can generate an estimate of $R_{\bar{v}}(k)$, which will be discussed in detail below.

The joint-covariance 434 can be bigger than the base covariance 418 for jointly processing multiple instances of the subcarriers 206. For example, the joint-covariance 434 can have more bits or values, bigger matrix dimension, such as having more columns or rows, or a combination thereof. The joint-covariance 434 being bigger than the base covariance 418 can due to the base covariance 418 representing covariance values individually for each of the subcarriers 206 and the joint-covariance 434 representing covariance values collectively for a set of the subcarriers 206.

The covariance module 410 can use the first communication unit 316, the second communication unit 336, the first control unit 312, the second control unit 334, or a combination thereof to calculate the joint-covariance 434. The covariance module 410 can store the joint-covariance 434 in the first storage unit 314, the second storage unit 346, or a combination thereof.

After calculating the joint-covariance 434, the control flow can pass from the covariance module 410 to the preparation module 412. The control flow can pass similarly as described above between the signal analysis module 402 and the initialization module 404 but using processing results of the covariance module 410 instead of results of the signal analysis module 402.

The preparation module 412 is configured to generate a whitener while accounting for transmissions based on the space-frequency block-coding scheme 208. The preparation module 412 can generate a joint-whitener 436.

The joint-whitener 436 is a value or a set of values used in the whitening process while accounting for transmissions based on the space-frequency block-coding scheme 208. The joint-whitener 436 can be used to whiten or randomize a combination of related portions within the receiver signal 124, such as portion corresponding to the interference signal 114.

The joint-whitener 436 can be used to whiten the portion corresponding to the interference signal 114, such as the communication subcarrier data 222 and the further subcarrier data 224 for various possible combinations involving the space-frequency block-coding scheme 208. For example, the joint-whitener 436 can be used to whiten when both the transmitter signal 110 and the interference signal 114 are not based on the space-frequency block-coding scheme 208.

Also for example, the joint-whitener 436 can be used to whiten when only one of the transmitter signal 110 and the interference signal 114 are based on the space-frequency block-coding scheme 208. For further example, the joint-whitener 436 can be used to whiten when both the transmitter signal 110 and the interference signal 114 are based on the space-frequency block-coding scheme 208.

The preparation module 412 can generate the joint-whitener 436 using the joint-covariance 434. The preparation module 412 can generate the joint-whitener 436 for de-correlating contents of the interference signal 114 to randomize the interference signal 114 by comprehensively or jointly whitening both the communication subcarrier data 222 and the further subcarrier data 224 based on the space-frequency block-coding scheme 208.

The preparation module 412 can generate the joint-whitener 436 similar to the initialization module 404 generating the base whitener 420 as described above, but for using the joint-covariance 434 instead of the base covariance 418. The preparation module 412 can further use Equations (5)-(6) to generate the joint-whitener 436 with the joint-covariance 434.

The preparation module 412 can use the first communication unit 316, the second communication unit 336, the first control unit 312, the second control unit 334, or a combination thereof to generate the joint-whitener 436. The preparation module 412 can store the joint-whitener 436 in the first storage unit 314, the second storage unit 346, or a combination thereof.

After generating the whitener, the control flow can pass from the preparation module 412 to the joint whitening module 414. The control flow can pass similarly as described above between the signal analysis module 402 and the initialization module 404 but using processing results of the preparation module 412 instead of results of the signal analysis module 402.

The joint whitening module 414 is configured to comprehensively or jointly whiten all data received using the subcarriers 206 for the receiver signal 124. The joint whitening module 414 can comprehensively or jointly whiten the interference signal 114 when one or more components of the receiver signal 124 is based on the space-frequency block-coding scheme 208.

The joint whitening module 414 can whiten both the communication subcarrier data 222 and the further subcarrier data 224 together in a comprehensive or joint manner, simultaneously involving both sets of data. The joint whitening module 414 can whiten the communication subcarrier data 222 and the further subcarrier data 224 using the joint-whitener 436.

Since detection process assumes that the interference, the noise, or a combination thereof will be random, the joint whitening module 414 can use the whitening process to de-correlate the interference signal 114, the noise, or a combination thereof associated with the communication subcarrier data 222 and the further subcarrier data 224. The base joint whitening module 414 can perform the whitening process by combining the joint-whitener 436, such as by multiplying, adding, performing matrix operations, or a combination thereof, with the communication subcarrier data 222 and the further subcarrier data 224.

The joint whitening module 414 can generate a joint-whitening output 438. The joint whitening module 414 can generate a joint-whitening output 438 based on the receiver signal 124 and the joint-whitener 436.

The joint whitening module 414 can generate the joint-whitening output 438 by combining the joint-whitener 436, the communication subcarrier data 222, and the further subcarrier data 224 or the conjugated instance of the further subcarrier data 224. The joint-whitening output 438 can include one, multiple, or all portions previously corresponding to the interference signal 114, the noise, or a combination thereof and having a block diagonal matrix as a covariance thereof after the whitening process.

The joint whitening module 414 can use the first communication unit 316, the second communication unit 336, the first control unit 312, the second control unit 334, or a combination thereof to perform the whitening process. The joint whitening module 414 can store the joint-whitening output 438 in the first storage unit 314, the second storage unit 346, or a combination thereof.

After generating the joint-whitening output 438, the control flow can pass from the joint whitening module 414 to the message processing module 406. The control flow can pass similarly as described above between the signal analysis module 402 and the initialization module 404 but using processing results of the joint whitening module 414 instead of results of the signal analysis module 402.

The message processing module 406 can be further configured to determine the communication content 108 by further analyzing the receiver signal 124 based on the joint-whitening output 438 generated from the joint whitening module 414 based on the joint-covariance 434 and the joint-whitener 436. The message processing module 406 and its sub-modules can determine a joint-estimation feedback 440.

The joint-estimation feedback 440 is a refined estimation of a bit, a symbol, or a combination thereof in the communication content 108. The joint-estimation feedback 440 can be determined based on processing results of the first iteration, such as the initial content estimate 424. The joint-estimation feedback 440 can further account for the receiver signal 124 having one or more component transmitted based on the space-frequency block-coding scheme 208.

The message processing module 406, including its sub-modules, can determine the joint-estimation feedback 440 similar to determining the initial content estimate 424 as described above, but based on the joint-whitening output 438 instead of the initial-whitening output 422. For example, the message processing module 406 can detect, decode, interleave, de-interleave, or a combination thereof based on the joint-whitening output 438 instead of the initial-whitening output 422. Also for example, the message processing module 406 can use likelihoods for determining the communication content 108, the joint-whitening output 438, or a combination thereof.

The message processing module 406 can further determine the joint-estimation feedback 440 as the result of the detection and decoding process. For example, the message processing module 406 can determined the joint-estimation feedback 440 for the communication word 210, the further word 212, the bit or symbol therein as determined satisfactory by the message processing module 406, the code word 111 passing the error check, or a combination thereof corresponding to the transmitter signal 110.

The message processing module 406 can determine the communication content 108, the joint-estimation feedback 440, portions therein, or a combination thereof using:

$$\hat{x}(k) = E(x(k)) = \Sigma_{s \in C} s P(x(k) = s).$$ Equation (8).

The message processing module 406 can determine the joint-estimation feedback 440 as an average of probabilities corresponding to the transmitter signal 110 or a portion therein corresponding to a certain symbol. The joint-estimation feedback 440 can be used similar to a pilot or reference portion of the symbol.

The message processing module 406, including the detector module 426, the adjustment module 428, the decoder module 430, or a combination thereof can similarly use the first control unit 312, the second control unit 334, the first communication unit 316, the second communication unit 336, or a combination thereof to determine the joint-estimation feedback 440 based on the joint-whitening output 438. The message processing module 406, including one or more of its sub-modules, can store the joint-estimation feedback 440 in the first storage unit 314, the second storage unit 346, or a combination thereof.

The message processing module 406 can determine the receiver signal 124 as instances of the code word 111 determined and verified therein when all instances of the code word 111 have been detected and decoded. Otherwise, the message processing module 406 can pass the control flow to the cancellation module 408 as described above.

The cancellation module 408 can calculate the interference estimate 432 using the joint-estimation feedback 440 instead of the initial content estimate 424 as described above. The cancellation module 408 can calculate the interference estimate 432 based on cancelling the joint-estimation feedback 440 from the receiver signal 124.

The cancellation module 408 can use:

$$\hat{r}(k) = \begin{bmatrix} y(2k) \\ y^*(2k+1) \end{bmatrix} - \begin{bmatrix} \hat{H}(2k) & 0 \\ 0 & \hat{H}^*(2k+1) \end{bmatrix} \begin{bmatrix} \hat{x}(2k) \\ \hat{x}^*(2k+1) \end{bmatrix}.$$ Equation (9).

The interference estimate 432 can be represented by and the joint-estimation feedback 440 can be represented by 'x̂'.

The covariance module 410, the preparation module 412, and the joint whitening module 414 can operate as described above based on processing results for the joint-estimation feedback 440 instead of the initial content estimate 424. For example, the covariance module 410 can calculate the joint-covariance 434 as described above with the interference estimate 432 based on cancelling the joint-estimation feedback 440 from the receiver signal 124. Also for example, the joint whitening module 414 can generate the joint-whitening output 438 using the joint-whitener 436 as described above based on cancelling the joint-estimation feedback 440 from the receiver signal 124.

As a more specific example, the covariance module 410 can calculate the joint-covariance 434 using:

$$\hat{R} = \frac{1}{|\mathbb{K}|}\sum_{k \in \mathbb{K}} \hat{r}(k)\hat{r}^H(k). \qquad \text{Equation (10).}$$

The term '$\mathbb{K}$' can represent the set of subcarrier pairs used for data-aided covariance estimation. The operation '||' can denote a set cardinality. The covariance module 410 can calculate '$\hat{R}$' as the estimate of the joint-covariance $R_{\tilde{v}}(k)$ shown in Equation (7).

The communication system 100 can continue the iteration until the message processing module 406 determines the receiver signal 124. For example, the communication system 100 can continue the iterative process until all instances of the code word 111 in a communication block have been detected and decoded. Also for example, the communication system 100 can continue the iterative process until a preset quantity for the code word 111, as preset by the communication system 100, the base station 106 using format or header portions of the transmitter signal 110, the communication standard, or a combination thereof.

It has been discovered that the joint-whitening output 438 based on the base covariance 418 and the base whitener 420 provides reduction in error and increase throughput for the communication system 100. The joint whitening process using the joint-whitening output 438, the base covariance 418, and the base whitener 420 across the subcarriers 206 can accurately account for correlations in the interference signal 114 due to the space-frequency block-coding scheme 208. The accounting for the space-frequency block-coding scheme 208 can improve the performance of the whitening process, which can lead to accurate detection and decoding of the communication content 108.

It has also been discovered that the initial-whitening output 422 from initially whitening the receiver signal 124 using the base covariance 418 and the base whitener 420, and the joint-whitening output 438 from subsequently whitening for the space-frequency block-coding scheme 208 using the joint-covariance 434 and the joint-whitener 436 provide for increased robustness with faster processing time. Initially using independent interference whitening as a starting point and subsequently refining the whitening process for the space-frequency block-coding scheme 208 can account for signals transmitted both with and without the space-frequency block-coding scheme 208. The combination process can further provide a dynamic starting point for the joint whitening process, which can reduce the number of iterations necessary to detect or decode the communication content 108.

It has further been discovered that the interference estimate 432 and the joint-estimation feedback 440 provide reliability and accuracy in detecting and decoding the communication content 108. The interference estimate 432 and the joint-estimation feedback 440 can provide reliability by estimating the interference signal 114, which can be used to accurately whiten the receiver signal 124 regardless of whether the signals were transmitted using the space-frequency block-coding scheme 208. The accuracy and improved convergence can be realized based on the fact that the estimations can be used to further separate content and interference, which can be an additional utilization for the processing results for eliminating errors.

Figure 5:
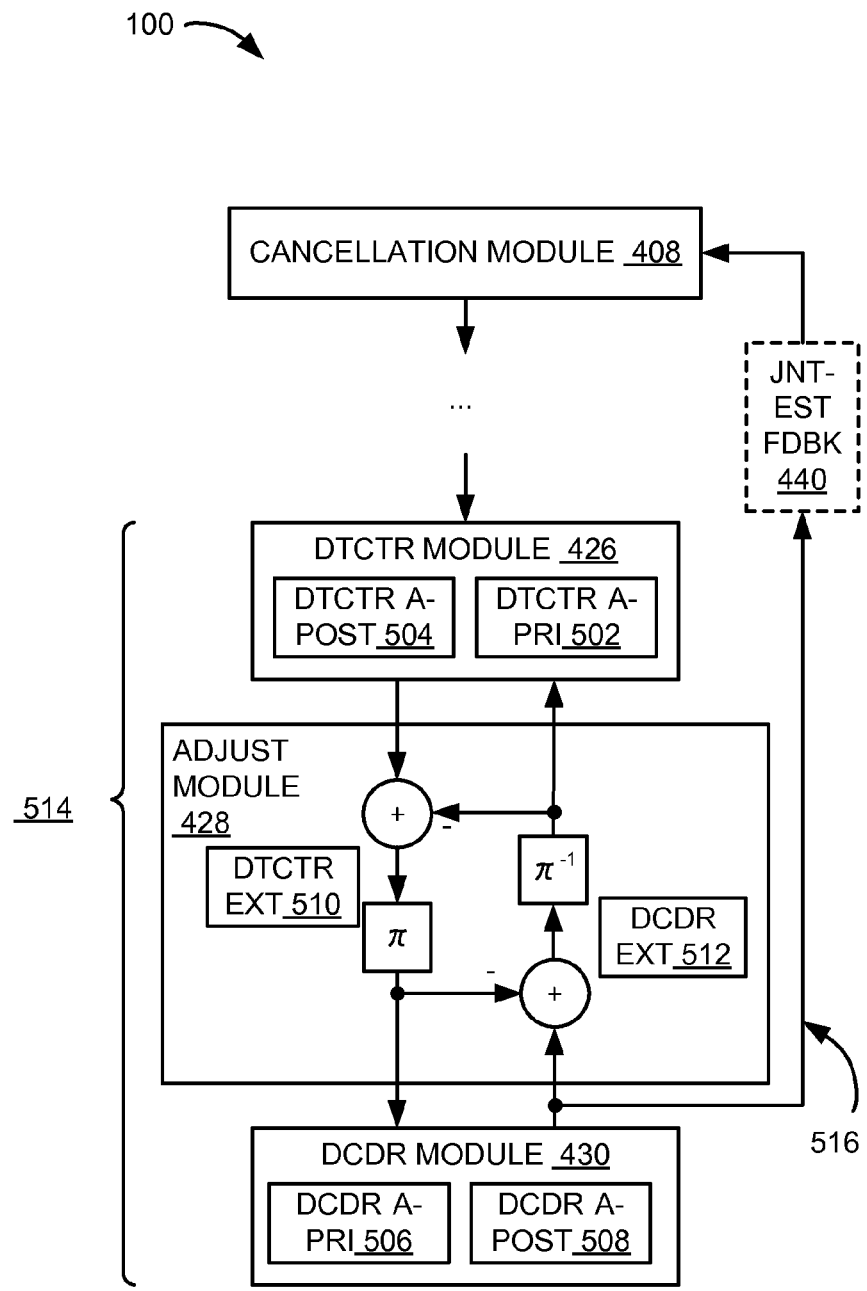
FIG. 5 is a detailed exemplary flow of the communication system.

Referring now to FIG. 5, therein is shown a detailed exemplary flow of the communication system 100. Details of the message processing module 406 of FIG. 4 and the iterative whitening and cancellation process following the initial iteration can be shown in FIG. 5.

For the detection process of the message processing module 406, the detector module 426 can determine a detector a-priori value 502, calculate a detector a-posteriori value 504, or a combination thereof. The detector a-priori value 502 is a prior knowledge for the detector module 426 about the communication content 108 of FIG. 1, the transmitter signal 110 of FIG. 1, the interference content 116 of FIG. 1, the interference signal 114 of FIG. 1, the receiver signal 124 of FIG. 1, a symbol therein, a bit therein, or a combination thereof.

The detector a-priori value 502 can be one or more measures of confidence levels associated with a likely transmitted symbol or likelihoods for all possible symbols, or the associated bit values, corresponding to the analyzed portion in the receiver signal 124. The detector a-priori value 502 can be a log likelihood ratio (LLR).

The detector a-priori value 502 can be expressed as:

$$L^a(b_i) = \log \frac{p(b_i = +1)}{p(b_i = -1)}. \qquad \text{Equation (11).}$$

The detector a-priori value 502 can be a logarithmic result of a ratio between a probability that a certain bit or symbol within the receiver signal 124 had a transmitted value of +1 and a different probability that the same bit or symbol had a transmitted value of −1 or 0.

The detector module 426 can determine a value resulting from a module external to the detector module 426, such as the decoder module 430 or the adjustment module 428, as the detector a-priori value 502. The detector module 426 can also determine a value resulting from a previous iteration in determining the communication content 108 as the detector a-priori value 502.

The detector a-posteriori value 504 is a later knowledge for the detector module 426 about the communication content 108, the transmitter signal 110, the interference content 116, the interference signal 114, the receiver signal 124, a symbol therein, a bit therein, or a combination thereof. The detector a-posteriori value 504 can be one or more measures of confidence levels associated with a likely transmitted symbol or likelihoods for all possible symbols, or the associated bit values, corresponding to an analyzed portion in the receiver signal 124. The detector a-posteriori value 504 can be a LLR.

The detector module 426 can calculate the detector a-posteriori value 504 according to:

$$L^A(b_i) = \log \frac{p(b_i = +1 \mid y)}{p(b_i = -1 \mid y)}.$$ Equation (12).

The detector a-posteriori value 504 can be a logarithmic result of a ratio between a probability that a certain bit or symbol within the receiver signal 124 had a transmitted value of +1 given the receiver signal 124, the initial-whitening output 422 of FIG. 4, the joint-whitening output 438 of FIG. 4, or a combination thereof and a different probability that the same bit or symbol had a transmitted value of −1 or 0 given the receiver signal 124, the initial-whitening output 422, the joint-whitening output 438, or a combination thereof.

The decoder module 430 can similarly determine a decoder a-priori value 506, calculate a decoder a-posteriori value 508, or a combination thereof. The decoder a-priori value 506 is a prior knowledge for the decoder module 430 about the communication content 108, the transmitter signal 110, the interference content 116, the interference signal 114, the receiver signal 124, a symbol therein, a bit therein, or a combination thereof.

The decoder a-priori value 506 can be similar to the detector a-priori value 502. For example, the decoder module 430 can determine the decoder a-priori value 506 based on Equation (11), a value resulting from a module external to the detector module 426, such as the detector module 426 or the adjustment module 428, a value resulting from a previous iteration in determining the communication content 108, or a combination thereof.

The decoder a-posteriori value 508 is a later knowledge for the decoder module 430 about the communication content 108, the transmitter signal 110, the interference content 116, the interference signal 114, the receiver signal 124, a symbol therein, a bit therein, or a combination thereof. The decoder a-posteriori value 508 can be similar to the detector a-posteriori value 504. For example, the decoder a-posteriori value 508 can be an LLR value. Also for example, the decoder module 430 can calculate the decoder a-posteriori value 508 using Equation (12) or an approximation based on Equation (12).

The detector module 426 can pass the detector a-posteriori value 504 to the adjustment module 428. The decoder module 430 can pass the decoder a-posteriori value 508 to the adjustment module 428. The adjustment module 428 can calculate a detector extrinsic value 510, a decoder extrinsic value 512, or a combination thereof. The adjustment module 428 can further interleave or de-interleave the processing results of the decoder module 430, the detector module 426, or a combination thereof.

For example, the adjustment module 428 can calculate the detector extrinsic value 510 based on the detector a-posteriori value 504. The adjustment module 428 can calculate the detector extrinsic value 510 using:

$$L^e(b_i) = L^A(b_i) - L^a(b_i)$$ Equation (13).

$$= \ln \frac{\sum_{x: b_i=+1} \exp\left(-|y - Hx|^2 + \frac{1}{2}\sum_{j\neq i} L^a(b_j)\right)}{\sum_{x: b_i=-1} \exp\left(-|y - Hx|^2 + \frac{1}{2}\sum_{j\neq i} L^a(b_j)\right)}.$$

The adjustment module can calculate the detector extrinsic value 510 as the difference between the detector a-posteriori value and the detector a-priori value 502, which can be the decoder extrinsic value 512 including de-interleaving of the values.

Also for example, the adjustment module 428 can calculate the decoder extrinsic value 512 based on the decoder a-posteriori value 508. The adjustment module 428 can also use Equation (13) and calculate the decoder extrinsic value 512 as the difference between the decoder a-posteriori value and the decoder a-priori value 506, which can be the detector extrinsic value 510 including interleaving of the values.

The adjustment module 428 can further approximate the detector extrinsic value 510, the decoder extrinsic value 512, or a combination thereof. The adjustment module 428 can approximate using:

$$L^e(b_i) \approx \max_{x: b_i=+1} \left(-|y - Hx|^2 + \frac{1}{2}\sum_{j\neq i} b_j L^a(b_j)\right) - \max_{x: b_i=-1} \left(-|y - Hx|^2 + \frac{1}{2}\sum_{j\neq i} b_j L^a(b_j)\right).$$ Equation (14).

Also for example, the adjustment module 428 can interleave or de-interleave by rearranging the order to change the sequence of likelihood values, bits, symbols, or a combination thereof. The adjustment module 428 can interleave or de-interleave based on pattern or format predetermined by the communication system 100, the communication standard, the coding scheme, or a combination thereof.

For illustrative purposes, the message processing module 406 is described as being partitioned between the detector module 426, the adjustment module 428, and the decoder module 430. However, it is understood that the message processing module 406 can be partitioned differently. For example, the detector extrinsic value 510 can be calculated in the detector module 426, the decoder extrinsic value 512 can be calculated in the decoder module 430, or a combination thereof.

The message processing module 406 can further include an iterative detection-decoding scheme 514. The iterative detection-decoding scheme 514 is a configuration or a set of instructions for repeating the detection and decoding processes until a condition is satisfied. The iterative detection-decoding scheme 514 can be a hardware configuration, a set of firmware steps, a set of software instructions, or a combination thereof.

For example, the iterative detection-decoding scheme 514 can be the wiring, adder, shifter, register settings, a combination thereof, or a location or sequence thereof. Also for example, the iterative detection-decoding scheme 514 can be a threshold, a condition, an instruction set, a repeat mechanism, or a combination thereof.

The message processing module 406 can use the iterative detection-decoding scheme 514 to repeat the process of the detector module 426, the decoder module 430, the adjustment module 428, or a combination thereof. The message processing module 406 can further use the iterative detection-decoding scheme 514 to initialize input values, feedback output value to a producing module, feedback output value to a module external to the producing module, or a combination thereof.

The message processing module 406 can use the iterative detection-decoding scheme 514 to control iteration specific to the detection, iteration specific to the decoding process, overall iteration of the detection and decoding, or a combination thereof. For example, the iterative detection-decoding scheme 514 can control iterations internal to the detector module 426, iterations internal to the decoder module 430, overall iterations for the message processing module 406 controlling a combination of the detector module 426, the adjustment module 428, and the decoder module 430.

The message processing module 406 can use the iterative detection-decoding scheme 514 to determine all instances of the code word 111 of FIG. 1 corresponding to the transmitter signal 110 or the communication content 108 therein. For example, the message processing module 406 can use the iterative detection-decoding scheme 514 to determine a quantity for the code word 111 predetermined by the communication system 100, the base station 106 of FIG. 1 using format or header portions of the transmitter signal 110, the communication standard, or a combination thereof.

The communication system 100 can similarly have a feedback profile 516. The feedback profile 516 is a configuration or a set of instructions for using an estimate of the receiver signal 124 to further process the receiver signal 124. The feedback profile 516 can be a hardware configuration, a set of firmware steps, a set of software instructions, or a combination thereof for controlling feedback of content estimation for cancelling, whitening, determining or a combination thereof.

The feedback profile 516 can be based on a number of code words used in transmitting the transmitter signal 110, the interference signal 114, or a combination thereof. For example, FIG. 5 can show the feedback profile 516 for processing one instance of the code word 111 using iterations in the transmitter signal 110, the interference signal 114, or a combination thereof.

For processing one code word, the feedback profile 516 can have an output of the decoder module 430 tied to an input of the cancellation module 408. The feedback profile 516 can have an output of the decoder module 430 directly tied to an input of the cancellation module 408 without any other feedback loops or connections outside of the iterative detection-decoding scheme 514.

The feedback profile 516 can have the joint-estimation feedback 440 for one instance of the code word 111 for feeding back to the cancellation module 408. The feedback profile 516 can have the joint-estimation feedback 440 representing the code word 111, the communication content 108, the interference content 116, the decoder a-posteriori value 508 corresponding thereto, the decoder extrinsic value 512 corresponding thereto, or a combination thereof fed back to the cancellation module 408.

The communication system 100 can operate based on the joint-estimation feedback 440 as described above. For example, the cancellation module 408 can determine the interference estimate 432 of FIG. 4, which can be the basis for calculating the joint-covariance 434 of FIG. 4, the joint-whitener 436 of FIG. 4, or a combination thereof.

It has been discovered that the iterative detection-decoding scheme 514 in conjunction with the joint-covariance 434, the joint-whitener 436, and the joint-estimation feedback 440 provide an effective way to iteratively suppress the interference signal 114 based on the space-frequency block-coding scheme 208 of FIG. 2. The joint whitening process can account for the space-frequency block-coding scheme 208 while the iterative detection-decoding scheme 514 can provide efficiently implementing the joint whitening process by iteratively determining and separating the communication content 108 and interference content 106, which can be further reused to suppress the interference signal 114.

Figure 6:
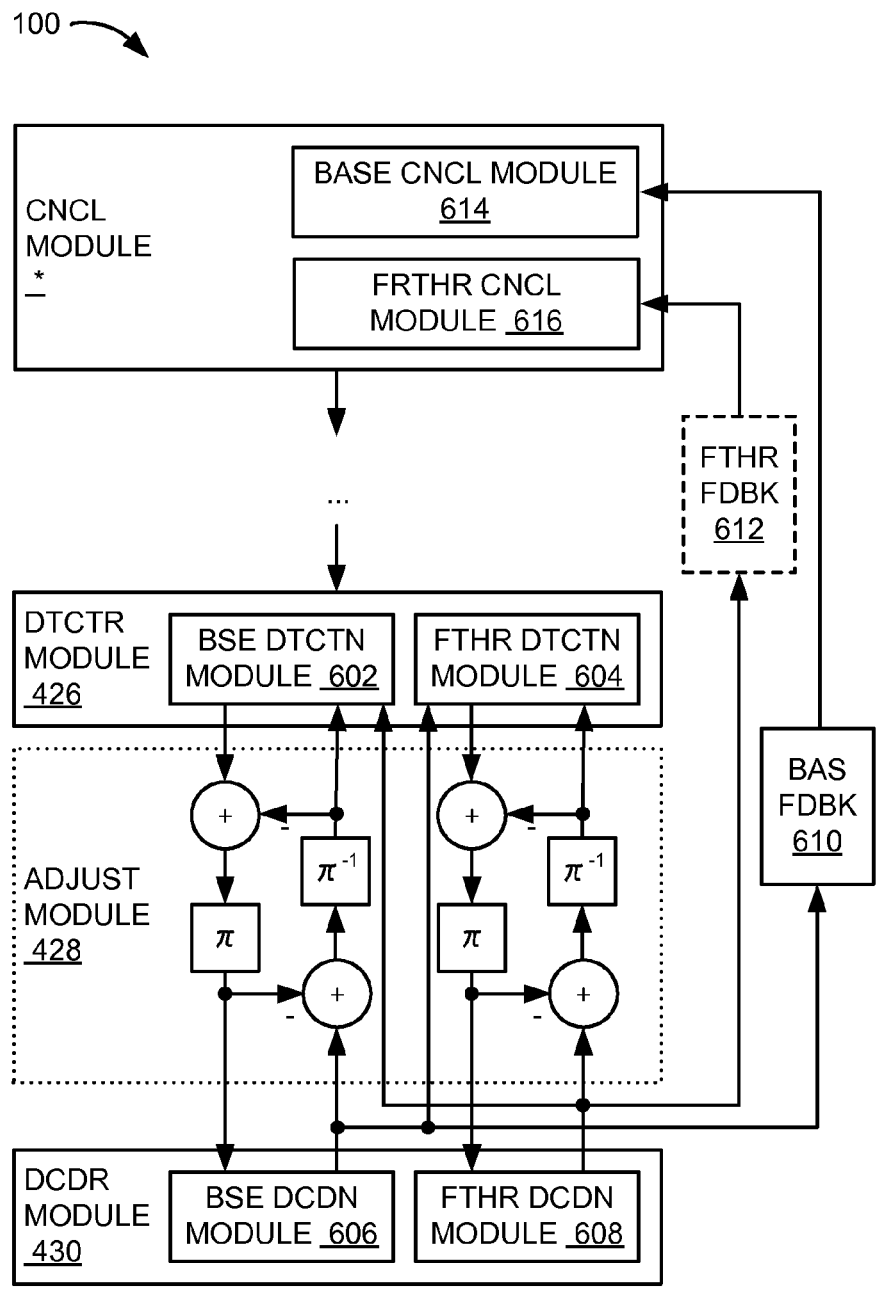
FIG. 6 is a further detailed exemplary flow of the communication system.

Referring now to FIG. 6, therein is shown a further detailed exemplary flow of the communication system 100. The communication system 100 can process two instances of the code word 111 of FIG. 1 using the iteration format. The detector module 426 can include a base detection module 602 and a further detection module 604 for simultaneously and jointly processing two instances of the code word 111. The decoder module 430 can similarly include a base decoding module 606 and a further decoding module 608.

The base detection module 602 and the base decoding module 606 can function similar to the detector module 426 and decoder module 430 as described above, but for processing one instance of the code word 111. Similarly the further detection module 604 and the further decoding module 608 can function similar to the detector module 426 and decoder module 430 described above, but for processing a different instance of the code word 111.

For example, the base detection module 602 can detect the communication word 210 of FIG. 2, including calculating the detector a-posteriori value 504 of FIG. 5. The base decoding module 606 can decode the communication word 210, including calculating the decoder a-posteriori value 508. The adjustment module 428 can calculate the detector extrinsic value 510 of FIG. 5 and the decoder extrinsic value 512 of FIG. 5, interleave, de-interleave, or a combination thereof for the communication word 210.

Also for example, the further detection module 604 can detect the further word 212 of FIG. 2, and the further decoding module 608 can decode the further word 212 using processes described above. The further detection module 604 and the further decoding module 608 can calculate and determine the various corresponding values for the further word 212.

The adjustment module 428 can process the instances of the code word 111 separately and independent of each other. For example, the adjustment module 428 can include circuitry or instructions corresponding to the iterative detection-decoding scheme 514 of FIG. 5 that process the communication word 210 exclusive of the further word 212. Also for example, the base detection module 602 and the base decoding module 606 can include circuitry or instructions corresponding to the iterative detection-decoding scheme 514 that process the communication word 210 exclusive of the further word 212.

As a more specific example, the base detection module 602 a portion of the adjustment module 428, and the base decoding module 606 can include a set of circuits or instructions separate from the further detection module 604, a different portion of the adjustment module 428, and the further decoding module 608. The communication system 100 can process the communication word 210 and the further word 212 in parallel, without the process of one affecting the process of the other, using the two independent sets of circuits or instructions.

Also a further specific example, the base detection module 602 and the base decoding module 606 can a set of circuits or instructions shared with the further detection module 604 and the further decoding module 608. The processing for the communication word 210 can be a base outer iteration, and the processing for the further word 212 can be a different outer iteration independent of the base outer iteration.

The feedback profile 516 of FIG. 5 can accommodate results for the two instances of the code word 111. The joint-estimation feedback 440 of FIG. 4 can include a base feedback 610 and a further feedback 612.

The base feedback 610 can be information regarding the communication word 210, such as the a-posteriori or extrinsic value, determined or verified instance of the communication word 210, a symbol or a bit therein, or a combination thereof. The further feedback 612 can be information regarding the further word 212, such as the a-posteriori or extrinsic value, determined or verified instance of the further word 212, a symbol or a bit therein, or a combination thereof.

The message processing module 406 of FIG. 4 can determine the joint-estimation feedback 440 having the base feedback 610 corresponding to the communication word 210 and the further feedback 612 for both and the further word 212. The base feedback 610 and the further feedback 612 can be for the communication word 210 the further feedback 612 and in the communication content 108 of FIG. 1.

The feedback profile 516 can provide the base feedback 610 from decoding the communication word 210 in the base decoding module 606 to the further detection module 604 for processing the further word 212, to the cancellation module 408 for cancelling the communication word 210, or a combination thereof. The feedback profile 516 can further provide the further feedback 612 from decoding the further word 212 in the further decoding module 608 to the base detection module 602 for processing the communication word 210, to the cancellation module 408 for cancelling the further word 212, or a combination thereof.

For example, the base decoding module 606 can be directly coupled to the further detection module 604, the cancellation module 408, or a combination thereof according to the feedback profile 516. Also for example, the further decoding module 608 can be directly coupled to the base detection module 602, the cancellation module 408, or a combination thereof according to the feedback profile 516.

The cancellation module 408 can include a base cancelling module 614 and a further cancelling module 616. The base cancelling module 614 is configured to cancel the communication word 210 from the receiver signal 124 of FIG. 1 or a portion therein, such as the communication subcarrier data 222 of FIG. 2, the further subcarrier data 224 of FIG. 2, a conjugation thereof, or a combination thereof. The further cancelling module 616 is configured to cancel the further word 212 from the receiver signal 124 of FIG. 1 or a portion therein, such as the communication subcarrier data 222, the further subcarrier data 224, a conjugation thereof, or a combination thereof.

The base cancelling module 614 and the further cancelling module 616 can be similar to the cancellation module 408 as described above. For example, the base cancelling module 614 can cancel the communication word 210 by cancelling the base feedback 610 from the receiver signal 124 or a portion therein, such as the communication subcarrier data 222, the further subcarrier data 224, a conjugation thereof, or a combination thereof. Also for example, the further cancelling module 616 can similarly cancel the further feedback 612.

The cancellation module 408 can calculate the interference estimate 432 of FIG. 4 by cancelling the communication word 210 before cancelling the further word 212. The cancellation module 408 can alternatively cancel the further word 212 before cancelling the communication word 210. The cancellation module 408 can calculate the interference estimate 432 as the result of cancelling both the base feedback 610 and the further feedback 612 from the receiver signal 124 or a portion therein, such as the communication subcarrier data 222, the further subcarrier data 224, a conjugation thereof, or a combination thereof.

The feedback profile 516 can provide the base feedback 610 from decoding the communication word 210 in the base decoding module 606 to the base cancelling module 614. The feedback profile 516 can also provide the further feedback 612 from decoding the further word 212 in the further decoding module 608 to the further cancelling module 616. For example, the base decoding module 606 can be directly coupled to the base cancelling module 614 according to the feedback profile 516. Also for example, the further decoding module 608 can be directly coupled to the further cancelling module 616 according to the feedback profile 516.

The communication system 100 can operate based on the joint-estimation feedback 440 as described above. For example, the cancellation module 408 can determine the interference estimate 432, which can be the basis for calculating the joint-covariance 434 of FIG. 4, the joint-whitener 426 of FIG. 4, or a combination thereof.

It has been discovered that the feedback profile 516 passing the base feedback 610 to the base cancelling module 614 and the further detection module 604 and passing the further feedback 612 to the further cancellation module 408 and the base detection module 602 provides reliability and accuracy in detecting and decoding the communication content 108. The feedback profile 516 can use the base feedback 610 and the further feedback 612 to account for multiple instances of the code word 111. Further, the feedback profile 516 providing the decoding results to both the detector module 426 and the cancellation module 408 can provide accurate and immediate updates to the detection process and the cancellation process regarding both the communication word 210 and the further word 212.

Figure 7:
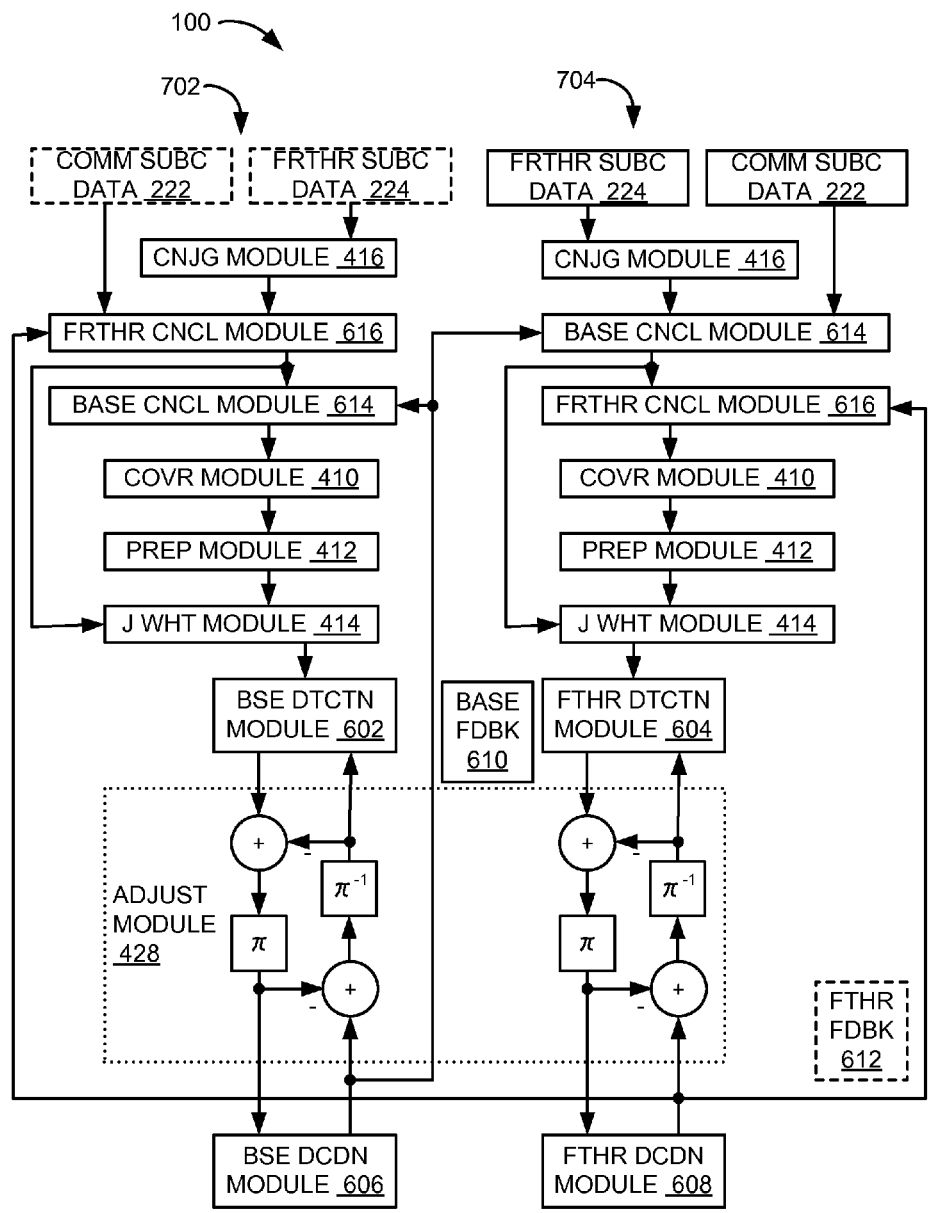
FIG. 7 is a further detailed exemplary flow of the communication system.

Referring now to FIG. 7, therein is shown a further detailed exemplary flow of the communication system 100. The communication system 100 can implement the successive interference cancellation in processing the receiver signal 124 of FIG. 1. The communication system 100 can successively cancel the interference using a base processing branch 702 and a further processing branch 704.

The base processing branch 702 is a set of circuits, instructions, modules, or a combination thereof for processing the communication word 210 of FIG. 2. The base processing branch 702 can determine the communication word 210.

The further processing branch 704 is a set of circuits, instructions, modules, or a combination thereof for processing the further word 212 of FIG. 2. The further processing branch 704 can determine the further word 212. The base processing branch 702 and the further processing branch 704 can be independent and separate sets of circuits, instructions, modules, or a combination thereof or share one or more portions therein.

For example, the communication system 100 can have instance of the conjugation module 416, the base cancelling module 614, the further cancelling module 616, the covariance module 410, the preparation module 412, the joint whitening module 414, or a combination thereof for the base processing branch 702. The communication system 100 can also have different instance of the conjugation module 416, the base cancelling module 614, the further cancelling module 616, the covariance module 410, the preparation module 412, the joint whitening module 414, or a combination thereof for the further processing branch 704.

As a more specific example, the base processing branch 702 and the further processing branch 704 can be separate circuitry or processes that can run in parallel to separately and simultaneously process for both the communication word 210 and the further word 212. As a further specific example, the base processing branch 702 and the further processing branch 704 can each represent an outer iteration. The communication system 100 can use one or more of the shared modules, circuits, instructions, or a combination thereof to process for the communication word 210 or the further word 212 during one outer iteration, and process for the other instance of the code word 111 of FIG. 1 during another outer iteration.

The base processing branch 702 can cancel the further feedback 612 from the receiver signal 124 or a portion therein, such as the communication subcarrier data 222 of FIG. 2 and the further subcarrier data 224 of FIG. 2, before the base feedback 610 by arranging the base cancelling module 614 to process after the further cancelling module 616. Similarly, the further processing branch 704 can cancel the further feedback 612 after the base feedback 610.

The base processing branch 702 can further pass the product of cancelling the further feedback 612 to the joint whitening module 414. The further processing branch 704 can pass the product of cancelling the base feedback 610 to the joint whitening module 414. The joint whitening module 414 can use the result from cancelling the further feedback 612 and then the base feedback 610 in the base processing branch 702, the result from cancelling the base feedback 610 and then the further feedback 612 in the further processing branch 704, or a combination thereof in whitening the signal.

The base processing branch 702 can further include the base detection module 602 and the base decoding module 606. The further processing branch 704 can include the further detection module 604 and the further decoding module 608.

The base detection module 602 can use the output of cancelling only the further feedback 612 from the further cancelling module 616, through the joint whitening module 414, or a combination thereof for the detection process. The further detection module 604 can use the output of cancelling only the base feedback 610 from the base cancelling module 614, through the joint whitening module 414, or a combination thereof for the detection process. The base detection module 602, the base decoding module 606, the further detection module 604, and the further decoding module 608 can operate as described above.

Thus, the communication word 210 and the further word 212 can be separately processed using the base processing branch 702 and the further processing branch 704. The communication system 100 or a portion therein, such as the message processing module 406 of FIG. 4, can determine the base feedback 610 using the base processing branch 702 and determine the further feedback 612 using the further processing branch 704.

The feedback profile 516 of FIG. 5 can be used to provide processing results of the base processing branch 702 to the further processing branch 704 and the results of the further processing branch 704 to the further processing branch 704. The feedback profile 516 can provide both the communication word 210 and the further word 212 to each of the base processing branch 702 and the further processing branch 704.

For example, the feedback profile 516 can provide the base feedback 610 for cancelling the communication word 210 to both the base processing branch 702 and the further processing branch 704. The feedback profile 516 can have the base decoding module 606 directly connected to the base cancelling module 614 for the base processing branch 702 and for the further processing branch. The feedback profile 516 can include feedback path from the base decoding module 606 to the base detection module 602 through the iterative detection-decoding scheme 514 of FIG. 5, without any other direct connections between the base detection module 602 and the base decoding module 606.

Also for example, the feedback profile 516 can provide the further feedback 612 for cancelling the further word 212 to both the base processing branch 702 and the further processing branch 704. The feedback profile 516 can have the further decoding module 608 directly connected to the further cancelling module 616 for the base processing branch 702 and for the further processing branch. The feedback profile 516 can include feedback path from the further decoding module 608 to the further detection module 604 through the iterative detection-decoding scheme 514, without any other direct connections between the further detection module 604 and the further decoding module 608.

It has been discovered that the base processing branch 702 and the further processing branch 704 for separately processing the communication word 210 and the further word 212, with each branch cancelling using both the base feedback 610 and the further feedback 612 as provided by the feedback profile 516 provide reduction in detection complexity while improving the error rate. The successive interference cancelling process implemented using the base processing branch 702, the further processing branch 704, and the feedback profile 516 reduces the amount of data being processed for the whitening process and the detection-decoding process.

Further, the joint-whitening process implemented with the covariance module 410, the preparation module 412, and the joint whitening module 414 in both the base processing branch 702 and the further processing branch 704 can accurately account for the correlation in signals based on the space-frequency block-coding scheme 208 of FIG. 2. The accounting of the correlation in signals across the subcarriers 206 of FIG. 2 can accurately whiten the interference signal 114 of FIG. 1, which can improve the accuracy.

The communication system 100 has been described with module functions or order as an example. The communication system 100 can partition the modules differently or order the modules differently. For example, functions of the covariance module 410 and the preparation module 412 can be combined. Also for example, calculation of the joint-covariance 434 of FIG. 4, generation of the joint-whitener 436, and the functions of the joint whitening module 414 can be combined or grouped into a module.

The modules described in this application can be hardware implementation or hardware accelerators, including passive circuitry, active circuitry, or both, in the first control unit 316 of FIG. 3 or in the second control unit 338 of FIG. 3. The modules can also be hardware implementation or hardware accelerators, including passive circuitry, active circuitry, or both, within the mobile device 102 of FIG. 1 or the base station 106 of FIG. 1 but outside of the first control unit 316 or the second control unit 338, respectively.

The physical transformation from the joint-covariance 434, the joint-whitener 436, and the joint-whitening output 438 of FIG. 4 results in the movement in the physical world, such as content displayed or recreated for the user on the mobile device 102. The content, such as navigation information or voice signal of a caller, recreated on the first device 102 can influence the user's movement, such as following the navigation information or replying back to the caller. Movement in the physical world results in changes to the interference signal 114 or interference channel estimate 128 of FIG. 1, which can be fed back into the system through the joint-estimation feedback 440 to influence the content or a determination thereof.

Figure 8:
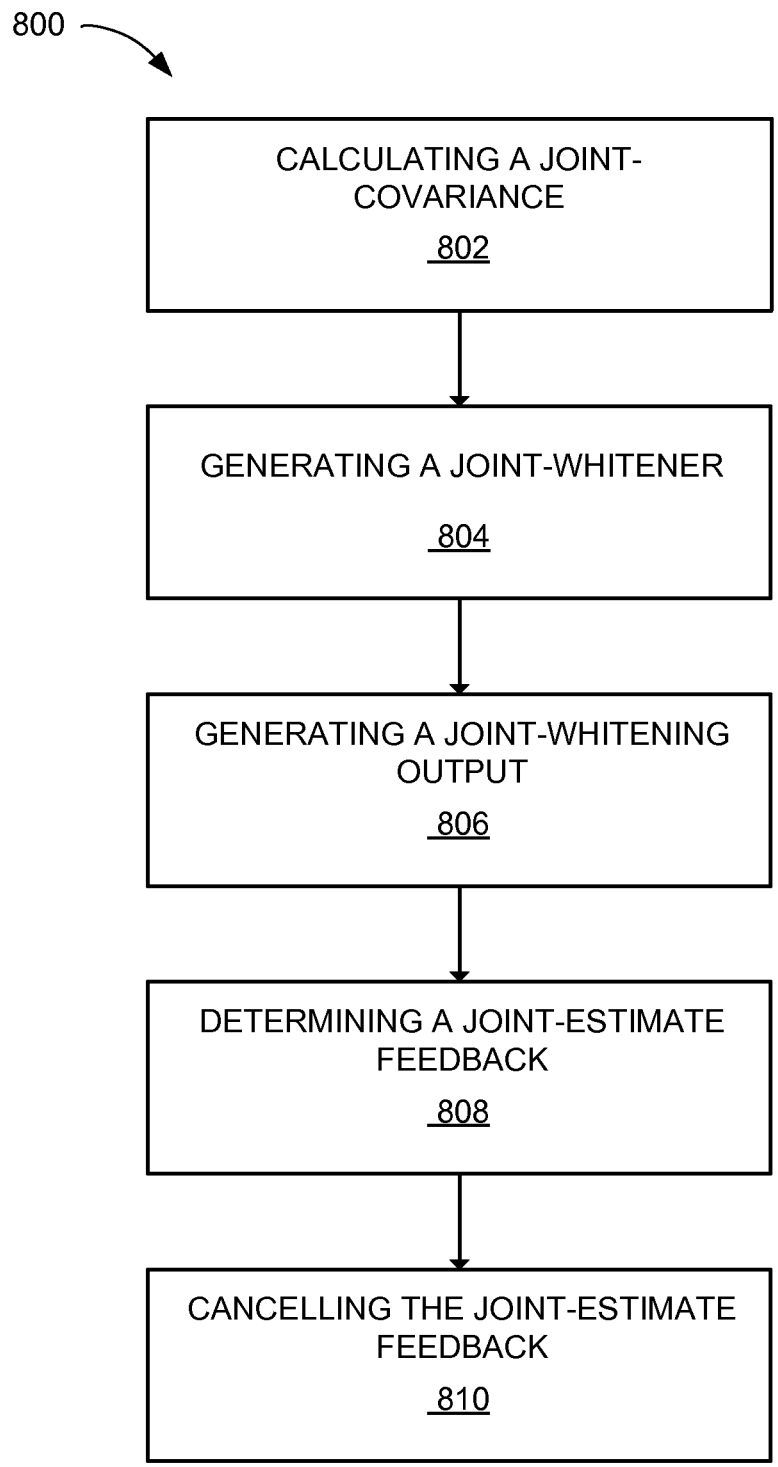
FIG. 8 is a flow chart of a method of operation of a communication system in an embodiment of the present invention.

Referring now to FIG. 8, therein is shown a flow chart of a method 800 of operation of a communication system 100 in an embodiment of the present invention. The method 800 includes: calculating a joint-covariance based on a receiver signal for communicating a communication content in a transmitter signal with an interference signal using subcarriers based on a space-frequency block-coding scheme in a block 802; generating a joint-whitener with a control unit based on the joint-covariance for randomizing the interference signal in a block 804; generating a joint-whitening output based on the receiver signal and the joint-whitener in a block 806; determining a joint-estimate feedback based on the joint-whitening output in a block 808; and cancelling the joint-estimate feedback from the receiver signal for communicating the communication content with a device in a block 810.

It has been discovered that the joint-whitening output 438 of FIG. 4 based on the base covariance 418 of FIG. 4 and the base whitener 420 of FIG. 4 provides reduction in error and increase throughput for the communication system 100. It has also been discovered that the initial-whitening output 422 of FIG. 4 from initially whitening the receiver signal 124 of FIG. 1 using the base covariance 418 and the base whitener 420, and the joint-whitening output 438 from subsequently whitening for the space-frequency block-coding scheme 208 of FIG. 2 using the joint-covariance 434 of FIG. 4 and the joint-whitener 436 of FIG. 4 provide for increased robustness with faster processing time.

It has further been discovered that the interference estimate 432 of FIG. 4 and the joint-estimation feedback 440 of FIG. 4 provide reliability and accuracy in detecting and decoding the communication content 108 of FIG. 1. It has been discovered that the iterative detection-decoding scheme 514 of FIG. 5 in conjunction with the joint-covariance 434, the joint-whitener 436, and the joint-estimation feedback 440 provide an effective way to iteratively suppress the interference signal 114 of FIG. 1 based on the space-frequency block-coding scheme 208.

It has been discovered that the feedback profile 516 of FIG. 5 passing the base feedback 610 of FIG. 6 to the base cancelling module 614 of FIG. 6 and the further detection module 604 of FIG. 6 and passing the further feedback 612 of FIG. 6 to the further cancellation module 408 of FIG. 4 and the base detection module 602 of FIG. 6 provides reliability and accuracy in detecting and decoding the communication content 108. It has been discovered that the base processing branch 702 of FIG. 7 and the further processing branch 704 of FIG. 7 for separately processing the communication word 210 of FIG. 2 and the further word 212 of FIG. 2, with each branch cancelling using both the base feedback 610 and the further feedback 612 as provided by the feedback profile 516 provide reduction in detection complexity while improving the error rate.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A communication system comprising:
   a communication interface configured to receive a receiver signal for communicating a communication content in a transmitter signal with an interference signal using subcarriers based on a space-frequency block-coding scheme;
   a control unit, coupled to the communication interface, configured to:
      calculate a joint-covariance based on the receiver signal;
      generated a joint-whitener based on the joint-covariance for randomizing the interference signal;
      generate a joint-whitening output based on the receiver signal and the joint-whitener;
      determine a joint-estimation feedback based on the joint-whitening output; and cancel the
      joint-estimation feedback from the receiver signal for communicating the communication content with a device.

2. The system as claimed in claim 1 wherein the control unit is configured to calculate the joint-covariance with an interference estimate based on cancelling the joint-estimation feedback from the receiver signal.

3. The system as claimed in claim 1 wherein the control unit is configured to:
   generate a base whitener based on a base covariance for separately processing portions in the receiver signal corresponding to the subcarriers and whiten the receiver signal with the base whitener for initially processing the receiver signal;
   determine an initial content estimate based on whitening the receiver signal; and
   cancel the initial content estimate from the receiver signal.

4. The system as claimed in claim 1 wherein the control unit is configured to:
   determine the joint-estimation feedback for a communication word in the communication content; and
   cancel the joint-estimation feedback from the receiver signal according to a feedback profile for the communication word.

5. The system as claimed in claim 1 wherein the control unit is configured to:
   determine the joint-estimation feedback having a base feedback and a further feedback for both a communication word and a further word in the communication content; and
   cancel the base feedback and the further feedback from the receiver signal according to a feedback profile for the communication word and the further word.

6. The system as claimed in claim 1 wherein the control unit is configured to:
   determine the joint-estimation feedback according to an iterative detection-decoding scheme; and
   cancel the joint-estimation feedback from the receiver signal according to a feedback profile.

7. The system as claimed in claim 6 wherein the control unit is configured to:
   determine the joint-estimation feedback corresponding to the transmitter signal; and
   determine an interference estimate according to the feedback profile for cancelling the transmitter signal from the receiver signal using the joint-estimation feedback for calculating the joint-covariance.

8. The system as claimed in claim 6 wherein the communication interface is configured to:
   receive the receiver signal having a communication word and a further word in the communication content;

wherein the control unit is configured to:
determine the joint-estimation feedback having a base feedback and a further feedback corresponding to the communication word and the further word; and
determine an interference estimate according to the feedback profile for cancelling the communication word and the further word from the receiver signal using the base feedback and the further feedback.

9. The system as claimed in claim 6 wherein the communication unit is configured to:
receive the receiver signal having a communication word and a further word in the communication content; and
wherein the control unit is configured to:
determine a base feedback using a base processing branch and a further feedback using a further processing branch, the base processing branch for determining the communication word and the further processing branch for determining the further word.

10. The system as claimed in claim 6 wherein the communication unit is configured to:
receive the receiver signal having a communication word and a further word in the communication content; and
where the control unit is configured to:
determine a base feedback using a base processing branch and a further feedback using a further processing branch, the base processing branch for determining the communication word and the further processing branch for determining the further word.

11. A method of operation of a communication system comprising:
calculating a joint-covariance based on a receiver signal for communicating a communication content in a transmitter signal with an interference signal using subcarriers based on a space-frequency block-coding scheme;
generating a joint-whitener with a control unit based on the joint-covariance for randomizing the interference signal;
generating a joint-whitening output based on the receiver signal and the joint-whitener;
determining a joint-estimation feedback based on the joint-whitening output; and
cancelling the joint-estimation feedback from the receiver signal for communicating the communication content with a device.

12. The method as claimed in claim 11 wherein calculating the joint-covariance includes calculating the joint-covariance with an interference estimate based on cancelling the joint-estimation feedback from the receiver signal.

13. The method as claimed in claim 11 wherein calculating the joint-covariance includes:
generating a base whitener based on a base covariance for separately processing portions in the receiver signal corresponding to the subcarriers;
whitening the receiver signal with the base whitener for initially processing the receiver signal;
determining an initial content estimate based on whitening the receiver signal; and
cancelling the initial content estimate from the receiver signal.

14. The method as claimed in claim 11 wherein:
determining the joint-estimation feedback includes determining the joint-estimation feedback for a communication word in the communication content; and
cancelling the joint-estimation feedback includes cancelling the joint-estimation feedback from the receiver signal according to a feedback profile for the communication word.

15. The method as claimed in claim 11 wherein:
determining the joint-estimation feedback includes determining the joint-estimation feedback having a base feedback and a further feedback for both a communication word and a further word in the communication content; and
cancelling the joint-estimation feedback includes cancelling the base feedback and the further feedback from the receiver signal according to a feedback profile for the communication word and the further word.

16. The method as claimed in claim 11 further comprising:
determining the joint-estimation feedback includes determining the joint-estimation feedback according to an iterative detection-decoding scheme; and
cancelling the joint-estimation feedback includes cancelling the joint-estimation feedback from the receiver signal according to a feedback profile.

17. The method as claimed in claim 16 further comprising:
receiving the receiver signal including the transmitter signal and the interference signal wherein:
determining the joint-estimation feedback includes determining the joint-estimation feedback corresponding to the transmitter signal; and
cancelling the joint-estimation feedback includes determining an interference estimate according to the feedback profile for cancelling the transmitter signal from the receiver signal using the joint-estimation feedback for calculating the joint-covariance.

18. The method as claimed in claim 16 further comprising:
receiving the receiver signal having a communication word and a further word in the communication content;
wherein:
determining the joint-estimation feedback includes determining the joint-estimation feedback having a base feedback and a further feedback corresponding to the communication word and the further word; and
cancelling the joint-estimation feedback includes determining an interference estimate according to the feedback profile for cancelling the communication word and the further word from the receiver signal using the base feedback and the further feedback.

19. The method as claimed in claim 16 further comprising:
receiving the receiver signal having a communication word and a further word in the communication content; and
wherein:
determining the joint-estimation feedback includes determining a base feedback using a base processing branch and a further feedback using a further processing branch, the base processing branch for determining the communication word and the further processing branch for determining the further word.

20. The method as claimed in claim 16 wherein:
receiving the receiver signal having a communication word and a further word in the communication content; and
wherein:
determining the joint-estimation feedback includes determining the joint-estimation feedback having a base feedback and a further feedback corresponding to the communication word and the further word according to the feedback profile for feeding back the base feedback and the further feedback in addition to the iterative detection-decoding scheme.

* * * * *